United States Patent
George et al.

(10) Patent No.: US 12,534,173 B1
(45) Date of Patent: Jan. 27, 2026

(54) SYSTEM AND METHOD FOR CONTROLLING DOCKING FOR A MARINE VESSEL

(71) Applicant: Brunswick Corporation, Mettawa, IL (US)

(72) Inventors: Trevor George, Savoy, IL (US); Brandon L. Tate, Walnut Hill, IL (US)

(73) Assignee: Brunswick Corporation, Mettawa, IL (US)

( * ) Notice: Subject to any disclaimer, the term of this patent is extended or adjusted under 35 U.S.C. 154(b) by 218 days.

(21) Appl. No.: 18/457,029

(22) Filed: Aug. 28, 2023

(51) Int. Cl.
*G06T 7/00* (2017.01)
*B63B 49/00* (2006.01)
*B63H 25/04* (2006.01)
*G05D 1/00* (2024.01)
*G06T 7/70* (2017.01)

(52) U.S. Cl.
CPC ............. *B63H 25/04* (2013.01); *B63B 49/00* (2013.01); *G05D 1/0206* (2013.01); *G06T 7/70* (2017.01); *G06T 2200/24* (2013.01)

(58) Field of Classification Search
CPC ....... B63H 25/04; G06T 7/70; G06T 2200/24; B63B 49/00; G05D 1/0206
USPC ......................................................... 701/21
See application file for complete search history.

(56) References Cited

U.S. PATENT DOCUMENTS

| | | | |
|---|---|---|---|
| 7,561,886 B1 | 7/2009 | Gonring et al. | |
| 10,053,193 B2 | 8/2018 | Nachem | |
| 10,259,555 B2 | 4/2019 | Ward et al. | |
| 10,322,787 B2 | 6/2019 | Ward | |
| 10,429,845 B2 | 10/2019 | Arbuckle et al. | |
| 11,403,955 B2 | 8/2022 | Derginer et al. | |
| 2016/0107727 A1* | 4/2016 | Nachem | B63B 21/04 |
| | | | 114/230.1 |
| 2017/0227639 A1 | 8/2017 | Stokes et al. | |
| 2017/0253314 A1 | 9/2017 | Ward | |
| 2019/0361457 A1 | 11/2019 | Johnson et al. | |
| 2020/0247518 A1* | 8/2020 | Dannenberg | B63H 21/21 |
| 2022/0291688 A1* | 9/2022 | Afman | G05D 1/0206 |

FOREIGN PATENT DOCUMENTS

WO 2018232376 A1 12/2018

* cited by examiner

*Primary Examiner* — Tiffany P Young
(74) *Attorney, Agent, or Firm* — Andrus Intellectual Property Law, LLP

(57) ABSTRACT

A method of controlling docking includes an imaging system configured to image an area around a marine vessel to generate image data and a control system. The control system is configured to receive a selected docking area, locate the selected docking area in the image data, locate at least one dock tie-off point along the selected docking area in the image data, identify an optimized docking location based on the selected docking area and the location of the at least one dock tie-off point, and generate a docking optimization action based on the optimized docking location.

19 Claims, 17 Drawing Sheets

SYSTEM AND METHOD FOR CONTROLLING DOCKING FOR A MARINE VESSEL

FIELD

The present disclosure generally relates to systems and methods of controlling docking for a marine vessel, including for autonomous and semi-autonomous docking controls.

BACKGROUND

The following U.S. Patents and publications provide background information and are incorporated herein by reference, each in its entirety:

U.S. Pat. No. 7,561,886 discloses a method by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

U.S. Pat. No. 10,322,787 discloses a system for maintaining a marine vessel in a body of water at a selected position and orientation that includes a global positioning system that determines a global position and heading of the vessel and a proximity sensor that determines a relative position and bearing of the vessel with respect to an object near the vessel. A controller operable in a stationkeeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

U.S. Publication No. 2020/0247518 discloses a marine propulsion system that includes at least one propulsion device and a user input device configured to facilitate input for engaging automatic propulsion control functionality with respect to a docking surface, wherein the user input device includes a direction indicator display configured to visually indicate a direction with respect to the marine vessel. A controller is configured to identify a potential docking surface, determine a direction of the potential docking surface with respect to the marine vessel, and control the direction indicator display to indicate the direction of the potential docking surface with respect to the marine vessel. When a user selection is received via the user input device to select the potential docking surface as a selected docking surface, and propulsion of the marine vessel is automatically controlled by controlling the at least one propulsion device to move the marine vessel with respect to the selected docking surface.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a system for controlling docking includes an imaging system configured to image an area around a marine vessel to generate image data and a control system. The control system is configured to receive a selected docking area, locate the selected docking area in the image data, locate at least one dock tie-off point along the selected docking area in the image data, identify an optimized docking location based on the selected docking area and the location of the at least one dock tie-off point, and generate a docking optimization action based on the optimized docking location.

In one embodiment, the control system is configured to locate the at least one dock tie-off point by processing the image data to identify dock tie-off elements and determining a location of each of the at least one dock tie-off elements relative to the selected docking area.

In another embodiment, the control system is further configured to identify at least one available docking location based on the image data and the location of the at least one dock tie-off point, and wherein determining the optimized docking location includes selecting from the at least one available docking location.

In another embodiment, the control system is further configured to identify boat connection points on the marine vessel and identify the optimized docking location based further on the boat connection points.

In another embodiment, the docking optimization action includes controlling a display device to display a docking optimization instruction based on the optimized docking location.

In another embodiment, the control system is further configured to, before receiving the selected docking area, automatically identify a potential docking surface based on proximity measurements and/or the image data and display the potential docking surface for selection via a user interface.

In another embodiment, the docking optimization action includes setting a target docking location based on the optimized docking location and/or user input, and wherein the control system is further configured to automatically control at least one marine drive to move the marine vessel from a current location to the target docking location.

In another aspect of the disclosure, a method of controlling docking includes identifying a selected docking area, with an imaging system on the marine vessel, imaging an area around the marine vessel to generate image data that includes at least one image of the selected docking area, locating at least one dock tie-off point along the selected docking area in the image data, identifying an optimized docking location based on the selected docking area and the location of the at least one dock tie-off point, and generating a docking optimization action based on the optimized docking location.

In one embodiment, locating at least one dock tie-off point includes processing the image data to identify dock tie-off elements and determining a location of each of the at least one dock tie-off elements relative to the selected docking area.

In another embodiment, the method includes identifying at least one available docking location based on the image data and the location of the at least one dock tie-off point and determining the optimized docking location by selecting from the at least one available docking location.

In another embodiment, the method includes identifying boat connection points on the marine vessel and identifying the optimized docking location based further on the boat connection points.

In another embodiment, the docking optimization action includes displaying a docking optimization instruction based on the optimized docking location.

In another embodiment, wherein the docking optimization action includes prompting a user to approve or deny the optimized docking location as a target docking location.

In another embodiment, the method includes, prior to receiving the selected docking area, automatically identifying a potential docking surface based on proximity measurements and/or the image data and displaying the potential docking surface for selection via a user interface.

In another embodiment, the method includes determining at least one suggested tie-off pattern based on at least one of the selected docking area and the optimized docking location and the relative location of the dock tie-off points, and generating a tie-off display based on the at least one suggested tie-off pattern.

In another aspect of the disclosure, a method of assisting an operator with docking a marine vessel includes identifying a docking location and, with an imaging system on the marine vessel, imaging an area around the marine vessel to generate image data. Dock tie-off points are then identified in the image data and a relative location of each of the dock tie-off points is determined relative to the docking location. A suggested tie-off pattern is determined based on the docking location and the relative location of each of the dock tie-off points, and a tie-off display is generated based on the suggested tie-off pattern.

In one embodiment, the tie-off display depicts a set of tie-off lines connecting boat connection points on the marine vessel to at least a portion of the dock tie-off points.

In another embodiment, the docking location is a target docking location identified in the image data, wherein the relative location of the dock tie-off points are determined based on at least one dimension of the marine vessel and distance measurements between dock tie-off points in the image data.

In another aspect of the present disclosure, a docking system for a marine vessel includes an imaging system configured to image an area around a marine vessel to generate image data and a control system configured to identify a docking location, identify a plurality of dock tie-off points in the image data, determine a relative location of each of the dock tie-off points relative to the docking location, determine a suggested tie-off pattern based on the docking location and the relative location of each of the dock tie-off points, and generate a tie-off display based on the suggested tie-off pattern.

In one embodiment, the docking location is a selected docking area or a target docking location identified in the image data, wherein the relative location of the dock tie-off points are determined based on at least one dimension of the marine vessel and distance measurements between dock tie-off points in the image data.

In another embodiment, the docking location is a current location of the marine vessel.

BRIEF DESCRIPTION OF THE DRAWINGS

The present disclosure includes the following Figures.

DETAILED DESCRIPTION

Figure 1:
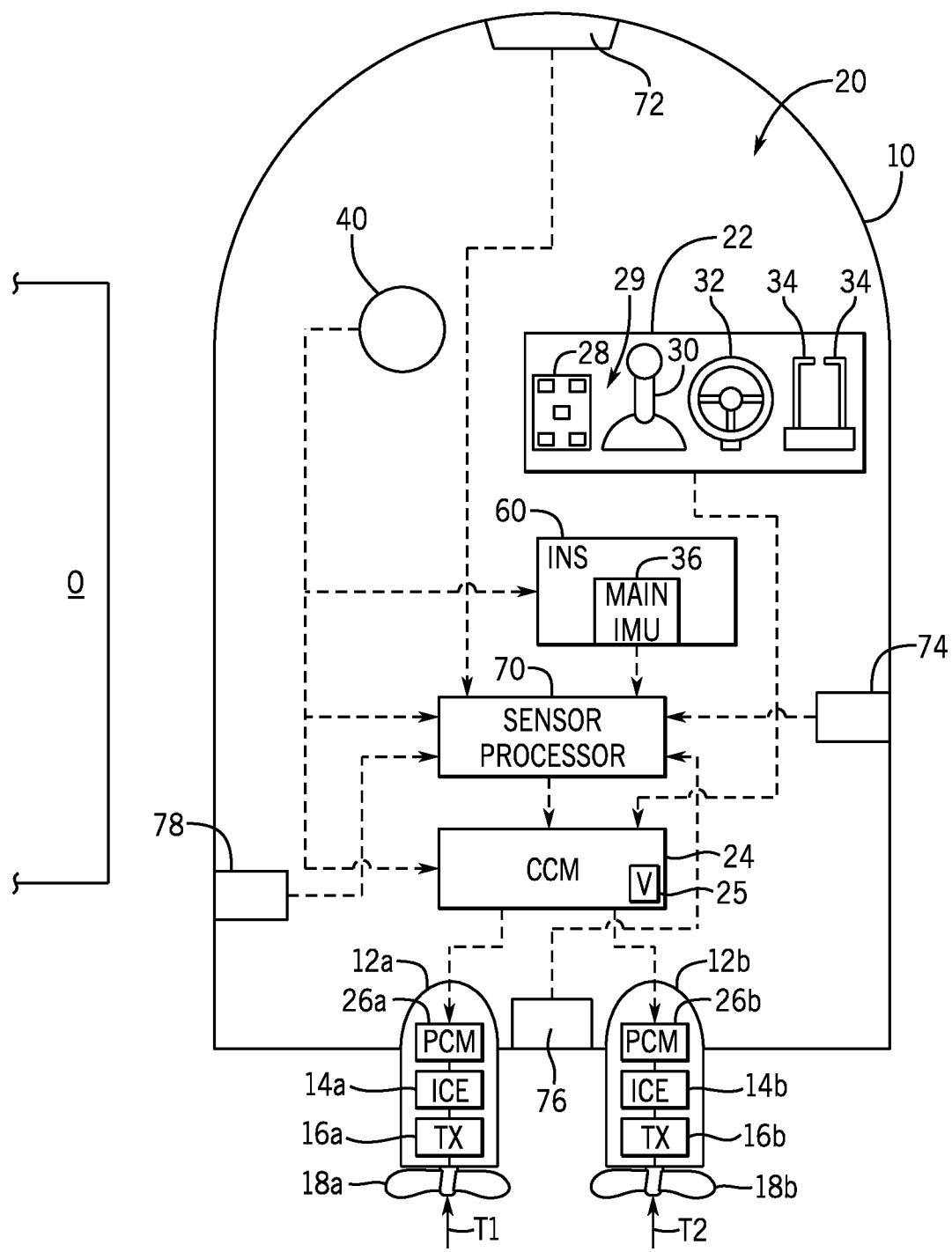
FIG. 1 is a schematic representation of an exemplary propulsion system on a marine vessel according to one embodiment of the present disclosure.

The present disclosure relates to marine vessel navigation and docking, including autonomous navigation. The inventors have recognized that properly docking a marine vessel is a challenging task that is often overcomplicated by ignorance of proper methods of securing a marine vessel and lack of awareness of proper docking locations that will securely keep a marine vessel in a fixed position while it is secured. Furthermore, the inventors have recognized that systems and vessel control methods are needed that visually identify and assess all of the vessel tie-off options in a docking area to select the best docking location for a given boat and/or a given tie-off purpose. In addition to not being able to visually identify tie-off points from a distance, or identify relative locations and measurements between tie-off points, users face other challenges, such as securing a marine vessel in an improper location, tying it improperly, and not knowing the optimal knots or tie-off patterns. Incorrectly securing a marine vessel can have severe consequences. Damage to the vessel and/or other property can result as the improperly secured marine vessel bumps into docks, objects in the water, and other boats.

Given those challenges, the inventors developed the disclosed system to provide driver assistance and/or automated control functionality to properly identify an optimized docking location and secure a marine vessel to dock tie-off points. To this end, the docking control system provides a user interface and control functionality that identifies potential docking surfaces and, upon selection, creates an optimized docking location based on dock tie-off points identified in the image data collected by the imaging system. The user interface may provide a docking optimization action and/or docking optimization instruction to direct navigation to the optimized docking location. In one embodiment, the selection of a desired tie-off pattern may generate a docking optimization action. This action may include displaying a docking optimization instruction based on the optimized docking location. The docking optimization instructions inform the user about what the optimized docking location is. These instructions may be presented before the marine vessel docks, or once the marine vessel is at or close to the target docking location (e.g., small adjustments to optimize the tie-off pattern based on the vessel's current location). In various embodiments, the user may execute the docking optimization instructions, or they may approve it and the system automatically docks or makes the adjustments.

As the marine vessel proceeds with docking, the docking control system may provide the user with a suggested tie-off pattern and a tie-off display to guide the user through the best way to secure the marine vessel to the dock, based on the dock tie-off points identified in the image data and, in some cases, information entered by the user. The suggested tie-off pattern may be associated with a tie-off purpose such as long-term storage or short-duration, temporary docking (such as for minutes or up to a few hours). The user interface may be controlled to present a few selectable options for common tie-off purposes, such as those already mentioned. The selected tie-off purpose may inform the suggested tie-off patterns and/or tie-off display provided to the user. The control system may use identified dock tie-off elements in proximity to the marine vessel to determine which tie-off patterns and docking optimization instructions are the best solutions for the present location of the marine vessel, or for a target docking location identified by the user or automatically identified by the control system based on image data.

FIG. 1 shows a marine vessel 10 equipped with a propulsion system 20 configured according to one embodiment of the disclosure. The propulsion system 20 is capable of operating, for example, in a joysticking mode where a joystick is operated by an operator to control vessel movement within an x/y plane, among other modes, as described hereinbelow. The propulsion system 20 has first and second marine drives 12a, 12b that produce first and second thrusts T1, T2 to propel the vessel 10. The first and second marine drives 12a, 12b are illustrated as outboard motors, but they could alternatively be inboard motors, stern drives, jet drives, or pod drives. In one embodiment, each marine drive 12a, 12b is provided with a powerhead, such as an engine 14a, 14b, operatively connected to a transmission 16a, 16b, in turn, operatively connected to a propeller 18a, 18b. In other embodiments, the powerhead may be an electric motor (e.g., powered by a battery or other power storage system) or a hybrid system comprising one or more of an electric motor and an internal combustion engine configured to initiate rotation of the propeller 18a, 18b.

The vessel 10 also houses various control elements that comprise part of the control system 25 for the propulsion system 20. The control system 25 comprises one or more controllers communicatively connected, and an operation console 22 in signal communication therewith, for example via a communication bus such as a CAN bus as described in U.S. Pat. No. 6,273,771. The one or more controllers of the control system 25 may comprise multiple hardware control devices communicatively connected, each including a hardware processor, such as for example a central controller 24 (e.g., shown as a command control module (CCM)) and/or propulsion control modules (PCM) 26a, 26b associated with the respective marine drives 12a, 12b. Each controller in the control system 25, such as controller 24 and the PCMs 26a, 26b, may include a memory and a programmable processor. As is conventional, each controller 24, 26a, 26b includes a processor communicatively connected to a storage system comprising a computer-readable medium that includes volatile or nonvolatile memory upon which computer-readable code and data are stored. The processor can access the computer-readable code and, upon executing the code, carry out functions, such as the navigation control functions and/or the proximity sensing functions, as described in detail below.

The control system 25 may further include one or more sensor processors 70, such as image processors configured to process the image data from the one or more image sensors 72-78. Given the large amount of image data produced by the image sensors 72-78, the connection between the sensors 72-78 and the sensor processor 70 may be via a dedicated bus or network connection. This dedicated bus or network connection is separate from the vessel network to allow transmission of a large amount of proximity measurement data (and, in some embodiments, IMU data) to the sensor processor 70. Such data transmission may not be possible on a typical vessel network, such as a CAN bus or wireless network where multiple devices are communicating. In still other embodiments, a dedicated communication link may be provided between the sensor processor 70 and the propulsion controller, such as the central controller 24.

The operation console 22 includes a number of user input devices, such as a keypad 28, a joystick 30, a steering wheel 32, and one or more throttle/shift levers 34. The operation console 22 may further include a display 29, such as may be associated with an onboard management system and/or a user interface, that is configured to visually present information to the operator (e.g., information regarding control mode, control settings, tie-off displays, suggested tie-off patterns, available docking locations, and docking optimization instructions), present control options to the operator, and receive user input from the operator in response to the control options. One example of such a display system is VesselView® by Mercury Marine Company of Fond du Lac, Wisconsin. The operation console 22 and user interface system may further include one or more mobile devices not positioned at the helm of the vessel, such as a user's mobile device communicating with the control system 25 via an application, such as via VesselView Mobile® by Mercury Marine. Each of these devices inputs commands to the control system 25. Controllers 24 within the control system 25, in turn, communicate control instructions to the first and second marine drives 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the marine drives 12a, 12b. The marine drives 12a, 12b are independently steerable about their steering axes. The throttle/shift levers 34 send signals to the controller 24 regarding the desired gear (forward, reverse, or neutral) of the transmissions 16a, 16b and/or the desired rotational speed of the engines 14a, 14b of the marine drives 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10.

The propulsion system 20 also includes one or more image sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The image sensors 72-78 include visual light sensors, distance sensors, and/or directional sensors configured to generate image data. For example, each of the image sensors 72-78 may be any one of a radar sensor, sonar sensor, standard visual light camera, stereovision camera or other camera configured to measure depth information, laser sensor (e.g. lidar or Leddar), Doppler direction finder, or other devices individually capable of determining both the distance and direction (at least approximately), i.e. the relative position of an object O with respect to the vessel 10, such as a dock, a seawall, a piling, another vessel, etc. The sensors 72-78 provide information regarding both a direction of the object with respect to the marine vessel 10 and the shortest distance between object O and the vessel 10.

Regarding the image sensors 72, 74, 76, 78, note that different types of sensors may be used depending on the distance between the vessel 10 and the object O and/or its relative direction to the vessel 10. For example, radar sensors may be used to detect objects at further distances. Once the vessel 10 comes within a particular distance of the object, lidar, ultrasonic, Leddar, or sonar sensors may instead be used. Camera sensors (such as including one or more stereovision cameras) may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the image sensors are positioned at each of the front, sides, and stern of the vessel 10, and include front-facing sensor 72, starboard-facing sensor 74, rear-facing sensor 76, and port-facing sensor 78. In a different exemplary sensor arrangement, two image sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and/or visual light cameras) to sense the shortest distance and the direction of the object with respect to the vessel 10. Alternatively, the sensor processor may use all available sensor data from all sensor types, which may be reviewed real-time as it is received or may be formulated into one or more maps or occupancy grids integrating all proximity measurement data, where the mapped data from all the operated sensors is processed as described herein. In such an embodiment, the proximity measurements and other information from the image data from each of the various sensors are all translated into a common reference frame, such as represented in a point cloud, occupancy grid, or other map of the environment.

Autonomous and/or advanced operator assistance (i.e., semi-autonomous) controls for improved vessel handling qualities require the placement of multiple image sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, an inertial measurement unit (IMU) 36 is installed at a known location on the marine vessel with respect to a predefined point of navigation, such as the center of rotation (COR) or center of gravity (COG). The installation orientation or the IMU 36 is also known. The installation locations of the IMU 36 and each proximity sensor 72-78 are established as part of a calibration procedure for the proximity sensing system.

Referencing the example in FIG. 1, the IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the IMU 36 and may also receive information from a GPS receiver 40 comprising part of a global positioning system (GPS). The GPS receiver 40 is located at a pre-selected fixed position on the vessel 10, which provides information related to global position of the marine vessel 10. The IMU 36 is also located at a known and fixed position with respect to the center of navigation determined for the marine vessel 10, such as the COR or COG.

The inventors have recognized that the above-mentioned operational challenges posed by a marine environment can be effectively dealt with by establishing and maintaining a buffer distance around the marine vessel, where the control authority provided to an operator is limited based on the buffer distance. For example, the control system 25 may continuously calculate a maximum velocity, or velocity limit, for the marine vessel as it approaches an object O, and may limit an operator's authority in controlling the propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls in order to force the marine vessel 10 away from a marine object O when the buffer zone is violated.

Figure 2:
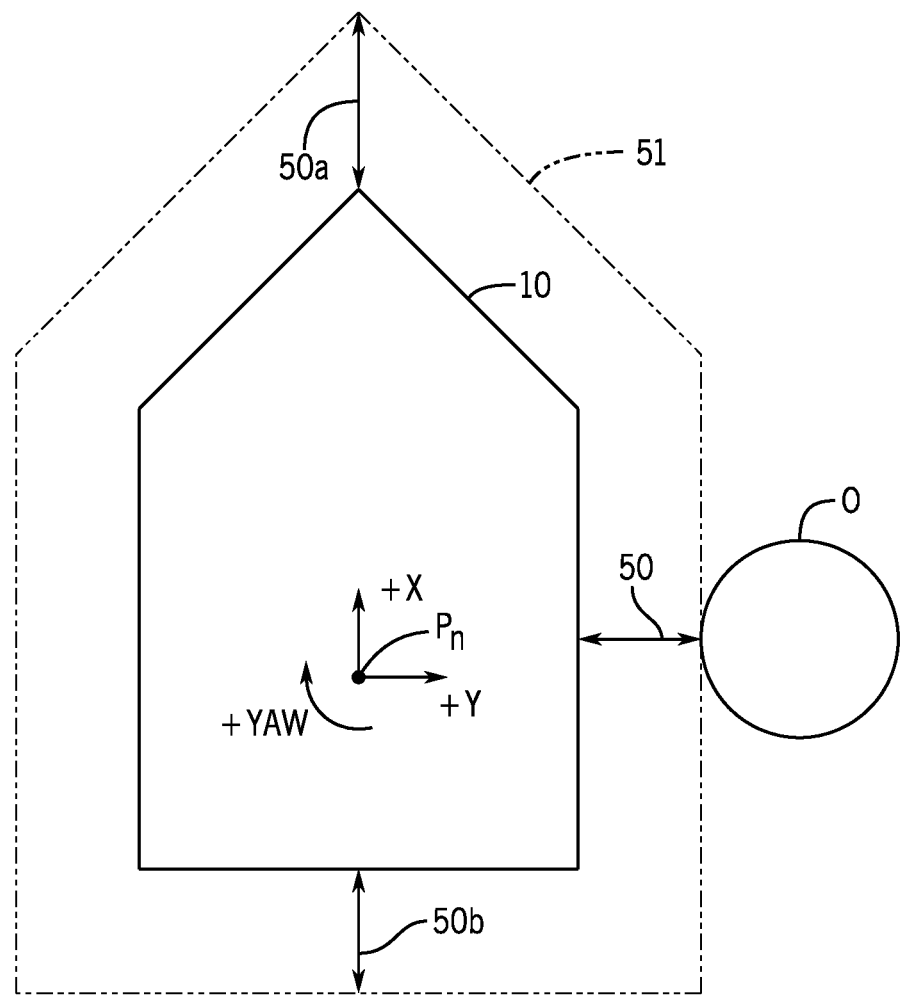
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated in order to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

Maintenance of the buffer zone is not always desired or practical, such as when the vessel is being docked and/or otherwise positioned to allow passengers to get on and off the marine vessel. Thus, the control system 25 may be configured to limit an operator's authority to control propulsion of the marine vessel in the direction of the object so as to provide a controlled approach and impact to an object, such as a dock. The control system 25 may be configured to modify or disable collision avoidance algorithms, such as the velocity limiting and autonomous buffer maintenance controls, upon receipt of a user-generated instruction to suspend the maintenance of the buffer distance from the object. In some embodiments, the control system remains responsive to user control inputs via a user input device, such as a joystick, to move the marine vessel in the direction of the object so as to provide a smooth and controlled impact between the marine vessel and the object, and/or to hold the marine vessel against the object, such as while passengers disembark. The user control, such as via the joystick 30, remains intuitive during the velocity-limited control modality. For example, the limited user input authority provided via the joystick may be implemented by rescaling and/or offsetting the propulsion commands associated with the joystick positions.

In other embodiments, the control system 25 provides autonomous control of propulsion so as to navigate the marine vessel 10 in tight spaces, such as during docking and launch. The inventors have recognized that docking a marine vessel is a challenging task, especially with external factors common in marine environments, such as wind, waves, and current. Accordingly, the inventors have recognized that autonomous control may be beneficial for certain marine vessel control tasks, especially those tasks requiring high visibility at all points around the marine vessel and/or precise propulsion control. Docking and launch are prime examples of such tasks because operators standing at the helm typically do not have good visibility at important points of the marine vessel, such as near the corners and along the exterior sides of the gunnels on the marine vessel. Likewise, operators often do not have full visibility of an entire docking surface, which may be visually blocked by portions of the vessel, other objects between the vessel and the dock, and/or may be too far away for good visual identification by an operator. Accordingly, the inventors have developed docking control systems and methods whereby the control system 25 identifies optimized docking locations based on available tie-off points, and in some embodiments the steps to move the marine vessel safely to an optimized docking location, may be performed autonomously utilizing advanced closed-loop control in conjunction with image sensors at key points around the marine vessel.

The autonomous or semi-autonomous control algorithms, such as effectuated by the control system 25, include velocity control software performing algorithms to calculate a maximum velocity for the marine vessel 10 as it approaches an object O. Where propulsion control is based on user input, the control system 25 may calculate a maximum velocity for the vessel and effectuate velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined, such as based on handling, comfort, or safety metrics.

Figure 3:
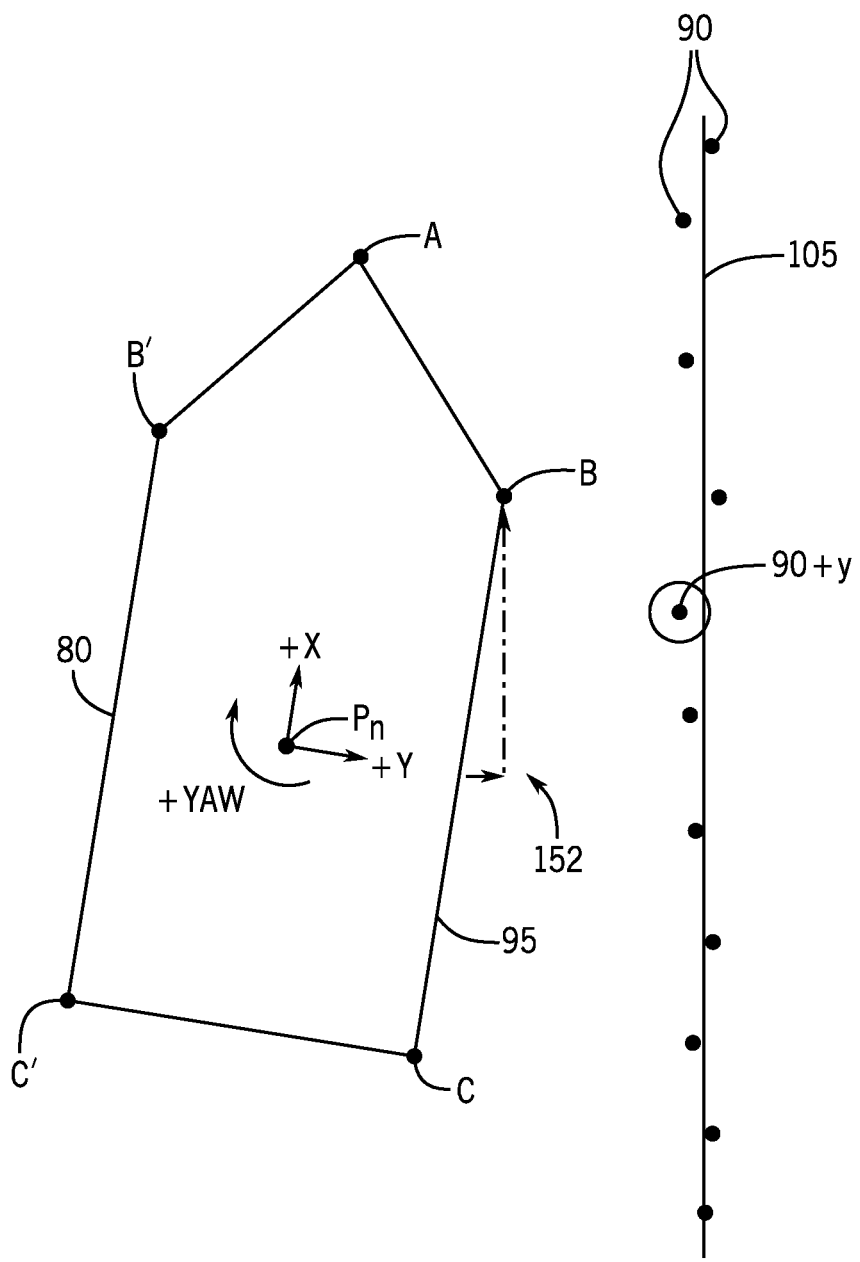
FIG. 3 illustrates one embodiment of a method for controlling propulsion of a marine vessel in an autonomous docking mode.

In certain embodiments, the control system 25 may be configured to identify potential docking surfaces in the marine environment around the vessel 10 based on the proximity measurements 90 by the various image sensors 72-78. As exemplified in FIG. 3, identifying the potential docking surface 105 may include identifying a linear relationship between a group of proximity measurements 90 located in a particular area. In one example, a potential docking surface 105 is identified based on the multiple proximity measurements 90 having a threshold linear relationship with respect to one another. In one embodiment, the potential docking surface 105 may be identified, or represented, as the best fit line based on relevant proximity measurements 90. For example, the controller 24 may be configured to identify and assess proximity measurements adjacent to or near each of the points in the image data to determine whether such a linear relationship exists. For example, the image data may be six values specifying one closest proximity measurement in each of the +/−x directions, +/−y directions, and +/−yaw rotational directions. In the example at FIG. 3, the marine vessel is approaching a docking surface on the starboard side, and thus multiple proximity measurements 90 align along that side. The closest proximity measurement $90_{+y}$ in the starboard direction may first be located, and then the linear relationship determination made therefrom. In other embodiments, all proximity measurements within a predetermined distance, such as calculated based on the simplified vessel outline 80, may be assessed to detect a linear relationship that represents a potential docking surface.

Upon identification of one or more potential docking surfaces 105, 105a, 105b around the marine vessel (FIGS. 3 and 5), a user interface may be controlled to present a user with options to engage auto-docking with respect to one or more of those potential docking surfaces. Exemplary user interfaces configured for such purposes are disclosed herein (e.g., like that shown in one or more of FIGS. 5-6C). Once a user selection is received to engage auto-docking with respect to a docking surface 105—e.g., by receiving a direction selection at a user input device (e.g., a touch screen, mouse or other selection device configured to interact with the display, or a joystick for selection of a direction with respect to the marine vessel, as described herein)—the controller may execute instructions to align the marine vessel 10 with the selected docking surface or surfaces and/or to move the marine vessel toward the selected docking surface 105 such that it gently impacts it. Velocity control may be engaged for such maneuvers based on the proximity of the docking surface and/or the needed alignment adjustment. For example, the velocity may be calculated using methods known to those skilled in the art, replacing the propulsion control user input with controller-determined instructions for aligning the marine vessel with the dock at the buffer distance and then moving the marine vessel up against the dock, which are angular and linear distance-based velocity determinations.

In certain embodiments, the control system 25 and the user input device(s) for providing docking-related control functionality, such as a joystick 30 or keypad 28, may be configured to allow a user to select one or more docking surface, which may be two perpendicular docking surfaces and to position the marine vessel 10 with respect to the selected perpendicular docking surfaces. For example, the user interface display 120 may be configured to display all potential docking surfaces identified around the marine vessel 10. For example, the user interface or user input device may visually depict multiple potential docking surfaces by illuminating or otherwise presenting direction indicators to indicate the direction of the potential docking surfaces with respect to the marine vessel.

Figure 4:
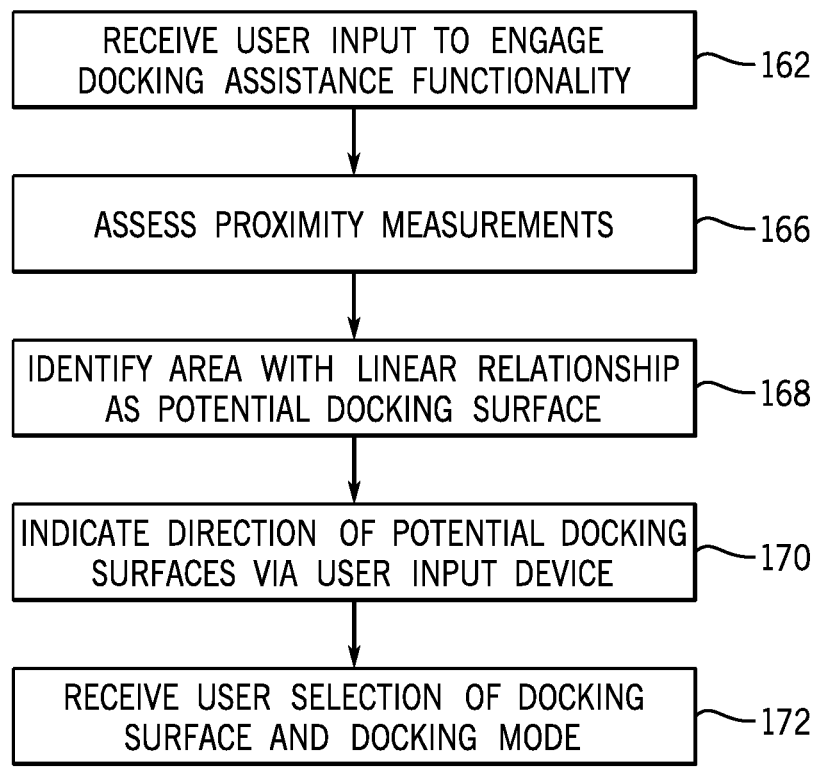
FIG. 4 is a flow chart exemplifying a method for controlling a propulsion system in accordance with embodiments of the present disclosure.

FIG. 4 depicts one embodiment of a method 160 of operating a propulsion system 20. User input is received at step 162 to engage docking assistance control functionality. This may be a user input provided to initiate the control system to detect potential docking surfaces 105. For example, the docking assistance functionality may be engaged in response to a user depressing the center key 116 on the keypad 28. Similar inputs may be provided via other user input devices, such as via a button 31 associated with the joystick 30. Once the docking assistance functionality is engaged, a data set of proximity measurements is identified at step 164. Potential docking surfaces 105 may then be identified at step 166 by assessing the image data, which may include proximity measurements. In other embodiments, visual image processing methods, such as computer vision machine learning (CVML), edge detection, and/or other pattern detection methods may be employed to identify a potential docking surface. In still other embodiments, the system may be configured to process visual image and depth information, such as generated by one or more stereovision cameras, to identify a potential docking surface.

Where proximity measurements are utilized, such as or including depth information generated by a stereovision camera, proximity measurements having a linear relationship may be located and then a potential docking surface 105 is identified at step 168 based on the located linearly aligned proximity measurements. For example, the potential docking surface may be identified as the least squares regression line or other best-fit line or surface (if 3D map) of a group of proximity measurements, such as may be represented in a point cloud, occupancy grid, or other map of the environment generated based on the image data. Alternatively or additionally, a CVML model may be trained to recognize a variety of types of potential docking surfaces based on the image data, such as docks, pilings, sea walls, or the like. The identified potential docking surface(s) may be labeled in a map generated based on the image data and/or proximity measurements, such as in an occupancy grip map or a point cloud map A direction of the identified potential docking surface with respect to the vessel's current location and/or orientation is indicated via a user interface at step 170, such as by presenting a direction indicator on a display 120 (see FIG. 5) of a user interface to visually indicate a direction of the potential docking surface with respect to the marine vessel 10. Alternatively or additionally, the direction indicator may be presented on a joystick 30 or other user input device at the operation console 22. A user selection is then received via the user input device at step 172 to select a docking surface and/or a docking mode. With reference to the examples described above, for example, the control system 25 and user interface display 120 may be configured to allow a user to select one of an auto-docking mode or a semi-autonomous docking mode where a user is provided some limited authority to control the marine vessel in order to effectuate docking.

Figure 5:
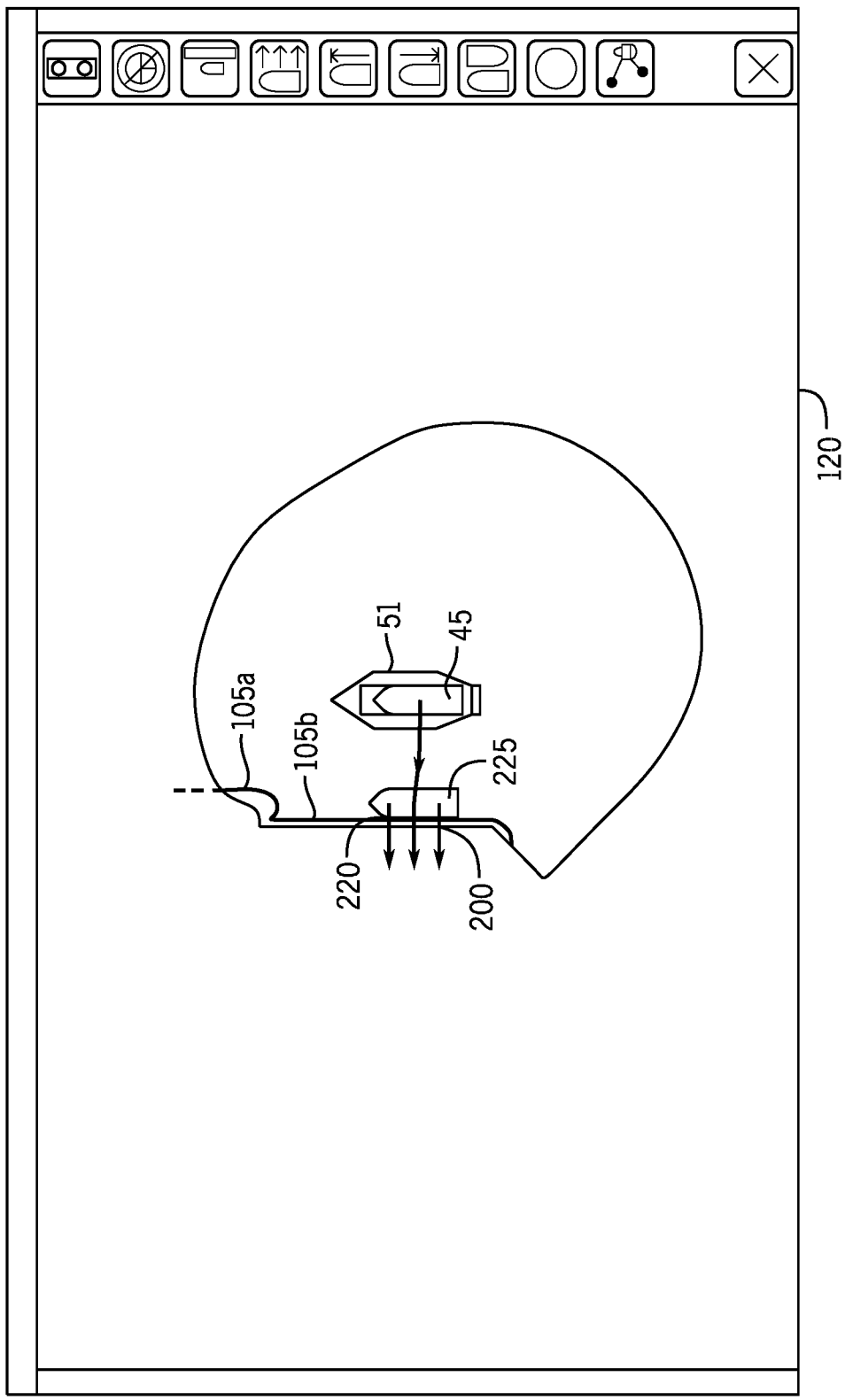
FIG. 5 is an exemplary display illustrating a target docking location according to one embodiment of the present disclosure.

FIG. 5 is an exemplary user interface display 120 for docking according to one embodiment of the present disclosure. The control system 25 may be configured such that the user may select anywhere on a user interface display 120 and the control system may automatically identify a selected docking area, such as based on potential docking surfaces identified based on the image data, an engaged control mode, and/or the input at the user interface display 120. For example, the control system 25 may be configured to interpret a user input as selecting an area in the images captured by one or more of the sensors 72-78 associated with the location on the user interface display 120 selected by the user, such as an area in the occupancy map around the point selected by the user input on the interface display 120. For example, if the user selects (e.g., by touching on a touchscreen display or clicking with a mouse or other selection device) an area on the display, the control system 25 identifies an area of the map associated therewith and identifies one or more closest potential docking surfaces in or nearest the user-selected area to identify one or more selected docking areas. As an illustrative example, the user interface display 120 may display one or more straight edges as a potential docking surface 105a, 105b. If a user selects a point on the screen on or near the line or representing a potential docking surface 105a, 105b, the control system 25 identifies that potential docking surface (or at least a section thereof) as the selected docking area. Referring to the example in FIG. 5, if a user touches a location on the display 120 along the potential docking surface 105b, then then potential docking surface 105b (or at least a portion thereof) becomes the selected docking area. In certain embodiments, the control system 25 may be configured to identify a portion of the selected potential docking surface 105b around the location on the display as the selected docking area.

The control system 25 may be configured to identify and locate dock tie-off points 200 along the selected docking area and to identify an optimized docking location based on the dock tie-off points. Dock tie-off points 200 may be locations identified in the image data that are capable of securing the marine vessel to a selected docking surface by one or more tie-off lines. In one embodiment, a subset of dock tie-off points 200 may be dock tie-off elements 205, where the dock tie-off elements 205 (as exemplified in FIG. 6A-C) are identified in the image data as objects that are typically used to secure a marine vessel for docking, such as pilings and cleats, in an arrangement that is suitable for docking and is proximate to the selected docking area.

For example, one or more CVML models may be trained to recognize a variety of types of dock tie-off elements in the image data, such as including cleats on a dock, pilings, seawalls with buoys or other attachment locations as dock tie-off points 200 that are proximate to the selected docking area or other docking location of interest. The selected docking area may be longer than the docking length of the vessel, and thus the optimized docking location may be a subset of the selected docking area. Alternatively or additionally, the optimized docking location may include a docking orientation of the vessel (e.g., which side of the vessel abuts the docking surface) and where the vessel should be located relative to the docking surface and/or the dock tie-off points (e.g., where to place the point of navigation Pn or some other location on the vessel relative to the dock tie-off points).

Alternatively or additionally, the system may be configured to differentiate between available dock tie-off points and unavailable dock tie-off points. Available dock tie-off points may be identified as elements to which a line can be connected from a particular docking location of interest. For example, an available dock tie-off point may be a cleat with no other line connected thereto and within a threshold distance and direction range of the docking location of interest. As another example, an available dock tie-off point may be a piling within the threshold distance and direction range of the docking location of interest and with no other line connected thereto that would interfere with connection of the vessel to the piling, such as no line crossing into the docking location of interest or into the area between the piling and the docking location of interest. For example, one or more CVML models may be trained to identify only available dock tie-off points based on the image data, such as being trained to identify dock tie-off points with no other lines connecting thereto (e.g., such as trained to only identify a cleat with no line tied thereto) and/or no interfering lines connecting thereto.

Having identified the dock tie-off points 200 (which in some embodiments may be only available dock tie-off points), the imaging system may measure the distance therebetween, such as the distance between two cleats and/or the distance from the cleats to the edges of the identified dock to determine an optimized docking location for the vessel 10. For example, the optimized docking location may be the position and/or orientation of the marine vessel 10 this is most beneficial to securing the marine vessel 10 to the dock tie-off elements 205 available at the selected target docking location 225. In FIG. 5, the optimized docking location 220 is illustrated as selected based on the identified dock tie-off points 200.

In one embodiment, the control system 25 may be configured to identify one or more available docking locations along, or within, the selected docking area based on the located dock tie-off points 200 and based on the known dimensions of the marine vessel 10. As described above, the control system 25 may be configured to identify which dock tie-off elements, or points 200, are available for use. Thus, the system may be configured to exclude dock tie-off points to which another vessel is already secured, particularly cleats to which another line is already connected. For example, when the distance between at least two available dock tie-off points (which may be adjacent points or any set of non-adjacent points) is greater than a minimum threshold length, the control system may identify that as an available docking location. For example, the threshold length may be a value greater than the length of the vessel 10 plus the buffer zone 51. Thus, the identified two dock tie-off points 200, such as cleats, may be adjacent to one another or may be non-adjacent (with one or several tie-off points between them) depending on the length of the vessel's docking side and the spacing of the tie-off points.

The control system may be configured to assess tie-off patterns and provide a suggestion to the user accordingly. In some embodiments, identifying the optimized docking location 220 may include assessment of tie-off patterns, such as to ensure that the vessel is properly positioned between dock tie-off points 200 to adequately secure the vessel. For example, the control system 25 may be configured to prompt a user to input a tie-off purpose (e.g., short-term docking vs. long term docking, calm water tie-off or rough water tie-off) and may assess the available tie-off points 200 accordingly. The suggested tie-off pattern may enable the use of different available docking locations. For example, a suggested tie-off pattern with a required distance between dock tie-off elements less than the length of the marine vessel may allow the control system to make more available docking locations for the user to select from on the user interface.

Alternatively or additionally, the control system may use the boat connection points 208 on the marine vessel to determine the optimized docking location 220. Boat connection points may include cleats or hooks on the exterior edge of the marine vessel 10. In one embodiment, the boat connection points 208 may be identified in the image data. In another embodiment, the control system 25 may access a stored vessel profile for the marine vessel that includes locations of the boat connection points 208 (see FIG. 6B) on the marine vessel 10. In still other embodiments, the location of the boat connection points 208 on the marine vessel 10 may be approximated, such as based on the vessel outline. The control system 25 may compare the location of the boat connection points to the location of the dock tie-off points 200. In one embodiment, dock tie-off points 200 identified in image data may be identified from images of a docking surface adjacent to the marine vessel wherein the docking location may be based on a current location of the marine vessel. In one embodiment, available docking locations may be identified based on whether the boat connection points 208 can be positioned between the identified dock tie-off elements. In another embodiment, the alignment of the boat connection points with the dock tie-off elements may be used to determine the optimized docking location.

Upon determining an optimized docking location 220, the control system 25 may prompt the user for input approving or denying the optimized docking location 220. The user interface display 120 may be configured to allow the user to adjust the optimization or deny the choice and request reassessment by the control system 25. Once approved, the optimized docking location becomes a target docking location 225 utilized by the navigation controller for controlling and/or limiting propulsion. Alternatively, the control system 25 may be configured to automatically select the optimized docking location as the target docking location 225 without approval input from the user.

Alternatively, rather than autonomously engaging the propulsion control system to navigate to the target docking location 225, the control system may provide guidance to the user based on the optimized docking location 220. For example, the adjustment may be optional, wherein the adjustment is proposed to the user as a suggestion via the user interface display 120.

Alternatively or additionally, the control system 25 may be configured to generate one or more displays to enable the user to prioritize methods of securing the marine vessel based on the available docking tie-off points, the boat connection points, and/or preferences of the user (such as the tie-off purpose). Such displays may include suggested available docking locations, suggested adjustments to the marine vessel's current position to move to an optimized docking location, and other suggested docking optimization actions. Once the target docking location 225 is selected, for example, the user interface may suggest tie-off patterns, docking optimization actions, and generate one or more tie-off displays (to assist in performing the suggested tie-offs).

In one embodiment, the control system may receive a selected tie-off purpose or a desired tie-off pattern from the user via a user interface. The optimized docking location may be determined based further on the selected tie-off purpose or the desired tie-off pattern. The control system may assist the operator with docking a marine vessel before the optimized docking location becomes a target docking location through user selection, as the marine vessel is navigating to the target docking location, after the marine vessel has reached the target docking location, or any time in between. In one embodiment, after dock tie-off points are identified in the image data, the relative location of each of the dock tie-off points relative to the docking location may be determined. In other embodiments, the control system may determine the relative location of the dock tie-off points based on depth information in the image data. The control system may determine a suggested tie-off pattern based on the docking location and the relative location of each of the dock tie-off points and generate a tie-off display based on the suggested tie-off pattern. The control system may use identified objects in the received image data, user input, selected tie-off purpose(s), the number of tie-off lines available on the marine vessel, and available docking tie-off points, what types of tie-off elements are available, as a non-limiting list, to determine the proper tie-off patterns and/or tie-off displays to present to the user. At least one suggested tie-off pattern is displayed to the user and the control system prompts the user for a selection. In one embodiment, when a user selection is received approving the suggested dock tie-off pattern, an optimized docking location is determined based on the user selected dock tie-off pattern.

If the user decides to decline selecting from the suggested tie-off patterns, the control system may determine a second match to the configuration of the marine vessel and the target docking location by comparing the distance and location of the dock and available dock tie-off points to the size and position of the marine vessel. When determining a suggested tie-off pattern, the control system may compare the current location of the marine vessel with expected wake zones and high-traffic areas, such as channels. For example, if a user inputs a selected tie-off purpose of a long-duration dock, then the control system may place the marine vessel further away from the end of the dock, where others may want to only dock temporarily. The control system may prompt for user input, such as input specifying a selected tie-off purpose or input specifying the number of lines on the marine vessel, and the suggested tie-off pattern may be generated based on the responsive information inputted by the user. The control system may use user input to determine whether there are a sufficient number of dock tie-off points and/or tie-off lines to perform a specific tie-off pattern. In some embodiments, the user input may determine which suggested tie-off patterns to present to the user. For example, if there are less tie-off lines than required for a suggested tie-off pattern, insufficient tie-off points, or the suggested tie-off pattern is incompatible with the user's selected tie-off purpose, as non-limiting examples, an insufficiency alert may be generated based on the limiting factor.

The control system may use the current location as determined by the GPS receiver in tandem with chart data to compare the current location of the marine vessel to known points of high traffic in a body of water. Other considerations for determining a suggested tie-off pattern may include a desired docking orientation by the user (such as port or starboard). To determine the best tie-off configuration, the control system may calculate the expected tide swings based on location data and/or charts, calculate expected weather based on received NOAA data, and categorize the dock type as either fixed or floating (this categorization can determine the need for slack in the bow/stern tie-off lines for long-duration docking). When comparing calculations, the control system may access a database comprising a plurality of possible configurations based on the determinations and/or calculations made by the control system. In other embodiments, the control system may compare the current condition and location of the marine vessel to a plurality of predetermined configurations designed to address common docking scenarios. The control system may generate a suggested tie-off pattern based on a high quantity of similarities between different attributes (such as the previously mentioned calculations and comparisons) of idealized scenarios (such as a long-term docking situation in turbulent waters or a short-term dock in a busy marina).

In some embodiments, the user interface display may provide additional tie-off pattern options on the tie-off display. The tie-off display may depict a set of tie-off lines connecting boat connection points on the marine vessel to at least a portion of the dock tie-off points. In one embodiment, boat connection points on the marine vessel may be identified in the image data and the suggested tie-off pattern may be based further on the boat connection points. Other tie-off pattern options may include a display of an optimal configuration to the user based on robustness of the desired tie-off pattern, a display of multiple configurations to the user ranked by available dock tie-off elements, a display of multiple configurations to the user sorted by needed materials (such as the needed number of tie-lines and/or bumpers/fenders), a display of multiple configurations to the user, sorted by tie-off purpose (such as a short-term or long-term dock), and/or a display of multiple configurations to the user, sorted by difficulty of implementation (for example, cleats may be easier to tie-off to than poles, a pole on a dock may be easier to secure a tie-off line to than a free-standing pole). In one embodiment, the tie-off display may provide a brief explanation why a higher ranked option is preferable, based on the calculations previously mentioned. The tie-off display may, upon selection of a suggested tie-off pattern, demonstrate methods of implementation to the user, such as which tie-off lines to secure first and how much slack to leave in a tie-off line based on the control system's measurements of the current wind and/or current direction, the selected tie-off purpose, and/or the tide range, as non-limiting examples. In one embodiment, if there is an insufficient number of dock tie-off points within a threshold distance of the docking location, the control system may generate an insufficiency alert when it generates the tie-off based on the insufficient number of dock tie-off points.

In some embodiments, while determining suggested tie-off patterns, the control system may use image data to determine whether bumpers are detected on the dock or the marine vessel. Visual confirmation may be necessary to determine if the user manually placed bumpers on the exterior of the marine vessel in preparation for docking. Upon determination that there are no detected bumpers, the control system may prompt the user to determine whether the marine vessel is equipped with inflatable bumpers. Upon determination of whether the marine vessel is equipped with inflatable bumpers, the control system will either auto-inflate the bumpers (if equipped) or prompt the user to deploy bumpers when unequipped with auto-inflatable bumpers. In one embodiment, the control system may prompt the user for additional information such as the number of available docking snubbers (which are used to absorb tie-off line shock), and/or pole floating loops (also known as "tideminders", which control docks/mooring tie-off lines in tidal or choppy waters and may also allow automatic line adjustment to tides).

Figure 6A:
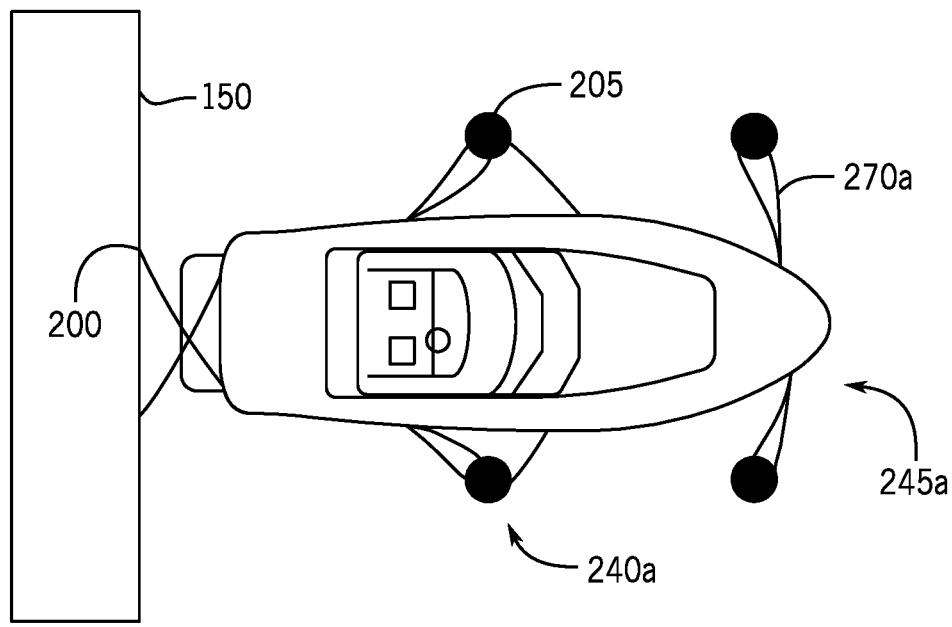
FIGS. 6A-C show exemplary suggested tie-off patterns according to one embodiment of the present disclosure.
Figure 6B:
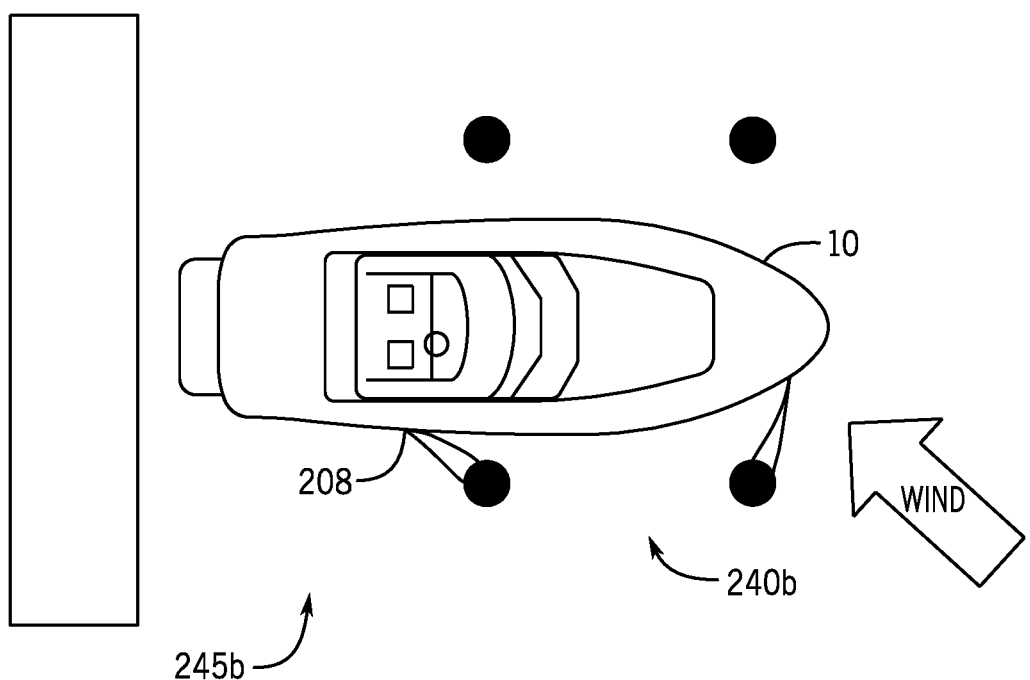
Figure 6C:
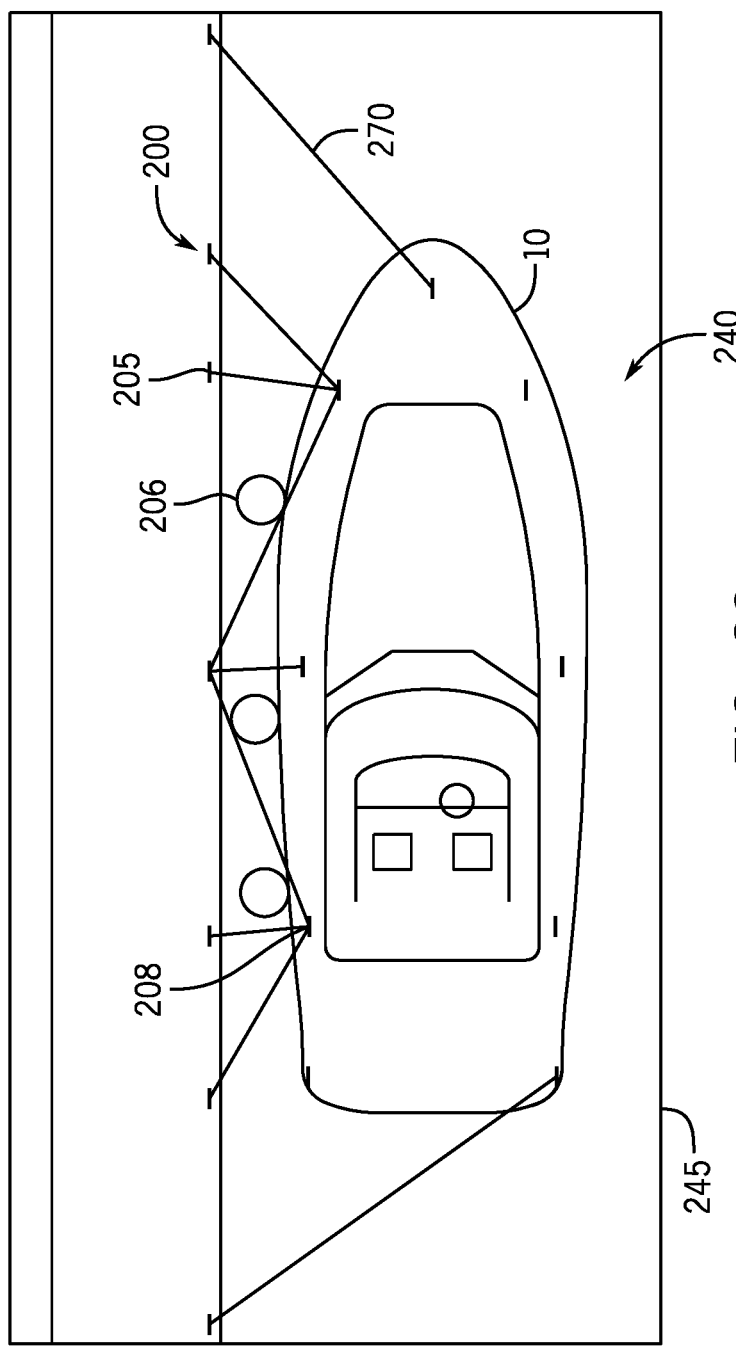

Referring now to FIGS. 6A-6C, the control system may be configured to generate a suggested tie-off pattern for securing the marine vessel 10 to a particular docking location, such as the optimized docking location, the target docking location, or a vessel's current location. The control system, through identification of dock tie-off elements 205 and/or other dock tie-off points 200 at the optimized docking location, and boat connection points 208, may provide a suggested tie-off pattern 240 that will best utilize the available tie-off points 200 in proximity to the docking location. When determining a suggested tie-off pattern, the control system may use dock tie-off points 200 identified in the image data to determine the location of tie-off points 200 and use identified dock tie-off elements to determine what object is located at the tie-off point 200 to secure to. In one embodiment, the user interface may provide a tie-off display 245 to visually illustrate the method of executing the suggested tie-off pattern. In one embodiment, the suggested tie-off pattern 240 may account for the known number of tie-off lines 270 present on the marine vessel (as provided by the user via user input). These visual and logistical aids may provide users with knowledge beyond their own experience that will enable the users to provide the most secure tie-off pattern possible without the impediments of ignorance or a lack of resources (tie-off lines, sufficient dock tie-off elements, etc.).

In some embodiments, suggestions for optimizing the securing of the marine vessel 10 to the target docking location may be correlated with a tie-off purpose. As an example, the user may dock by the shore to eat lunch and depart shortly thereafter. This type of docking may affect the target docking location (by the shore as opposed to secured to a piling in the middle of a lake) and prompt the control system to propose a simple suggested tie-off pattern. The tie-off purpose submitted to the docking control system may affect the determination of a desired tie-off pattern. In one embodiment, the control system may submit a first suggested tie-off pattern 240a to the user via a first tie-off display 245a, as depicted in FIG. 6A, wherein the user chooses not to follow the first suggested tie-off pattern 240a. When the control system receives user input rejecting the first tie-off pattern, the control system may identify at least a second suggested tie-off pattern 240b, as depicted in FIG. 6B, based on the docking location and the relative location of the dock tie-off points 200, wherein the second tie-off pattern 240b is different than the first tie-off pattern. Upon identifying a second suggested tie-off pattern 240b, the control system may generate a second a tie-off display 245b based on the second suggested tie-off pattern 240b.

The system may be configured to adjust the tie-off display 245 may, upon receipt of a selection of a suggested tie-off pattern 240a or 240b, to demonstrate methods of implementation to the user, such as which tie-off lines to secure first and how much slack to leave in a tie-off line based on the control system's measurements of the current wind and/or current direction, as an example. In another embodiment, a desired tie-off pattern may inform the docking control system of tie-off pattern preferences that could not be observed by the imaging system or determined by a state of the marine vessel. For example, the user may intend to secure the marine vessel for an extended period of time. In one embodiment, the user interface may provide a number of selectable tie-purposes such as "extended stay" and "brief stop" that may contain indicators that signify to the control system which suggested tie-off patterns might be most appropriate for the selected tie-off purpose. In one embodiment, the user may select from a number of tie-off patterns stored within the control system. Using this interface, the user may select a desired tie-off pattern. This feature may allow the user to explore unfamiliar tie-off patterns or practice specific tie-off patterns, as non-limiting examples. This integration between a user selection and the determination of its applicability to the current docking situation of the marine vessel is an embodiment in which the docking control system optimizes user-determined selections to ensure the optimized docking location remains as optimal as possible while providing the user the determination to elect preferred docking options such as the docking optimization actions suggested by the control system, the suggested tie-off pattern, and the tie-off purpose, as non-limiting examples.

In one embodiment, the user may guide the marine vessel to a position adjacent to a potential docking surface. Detecting the proximity to the potential docking surface and any proximal dock tie-off elements, the user interface display 120 may suggest adjustments to the current position of the marine vessel based on its current position. In another embodiment, the control system may, through the comparison of the size of the vessel outline, known marine vessel dimensions, and/or the position of any identified dock tie-off elements along potential docking surfaces, rank the available docking locations according to the best fit and maneuverability for the marine vessel. In another embodiment, the control system may position the marine vessel according to the direction of the user and, upon arriving at the directed location, provide docking optimization instruction based upon the available dock tie-off points around the marine vessel 10. In another embodiment, the user may submit the number of lines to the user interface and receive a suggested tie-off pattern and/or a docking optimization direction to secure the marine vessel.

Figure 7:
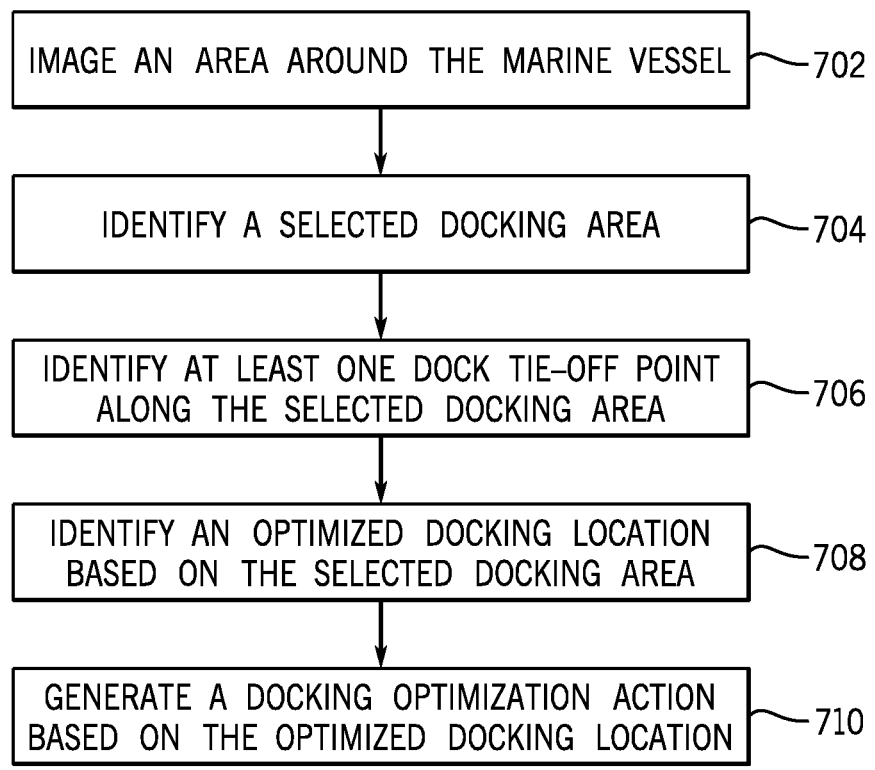
FIG. 7 illustrates an exemplary method for controlling docking in accordance with embodiments of the present disclosure.

FIG. 7 illustrates an exemplary method for controlling docking. In one embodiment, the method may be initiated as the user engages an autonomous docking mode and/or the system is approaching and identifies one or more docking surfaces in the image data. At 702, an area around the marine vessel is imaged. When imaging the area around the marine vessel, the image system generates a map of the surrounding environment based on image data and/or proximity measurements, as described above. At 704, a selected docking area is identified. Identification of a selected docking area may include user input to select a docking area via the user interface, wherein the selected docking area is a general selection or region of area on the user interface for the marine vessel to dock. Alternatively, where only one available docking surface is identified and an autonomous docking mode is engaged, the control system 25 may automatically select a closest potential docking surface as a selected docking area. At 706, at least one dock tie-off point along the selected docking area is identified. The at least one dock tie-off point may be identified by the control system in the image data, as previously described. At 708, an optimized docking location is identified based on the selected docking area. At 710, a docking optimization action is generated based on the optimized docking location. The docking optimization action may include one or more of: displaying the optimized docking location, prompting the user for approval or adjustment, setting the optimized docking location as a target docking location to be used by the navigation system, and automatically controlling propulsion to move the vessel towards the target docking location.

Figure 8:
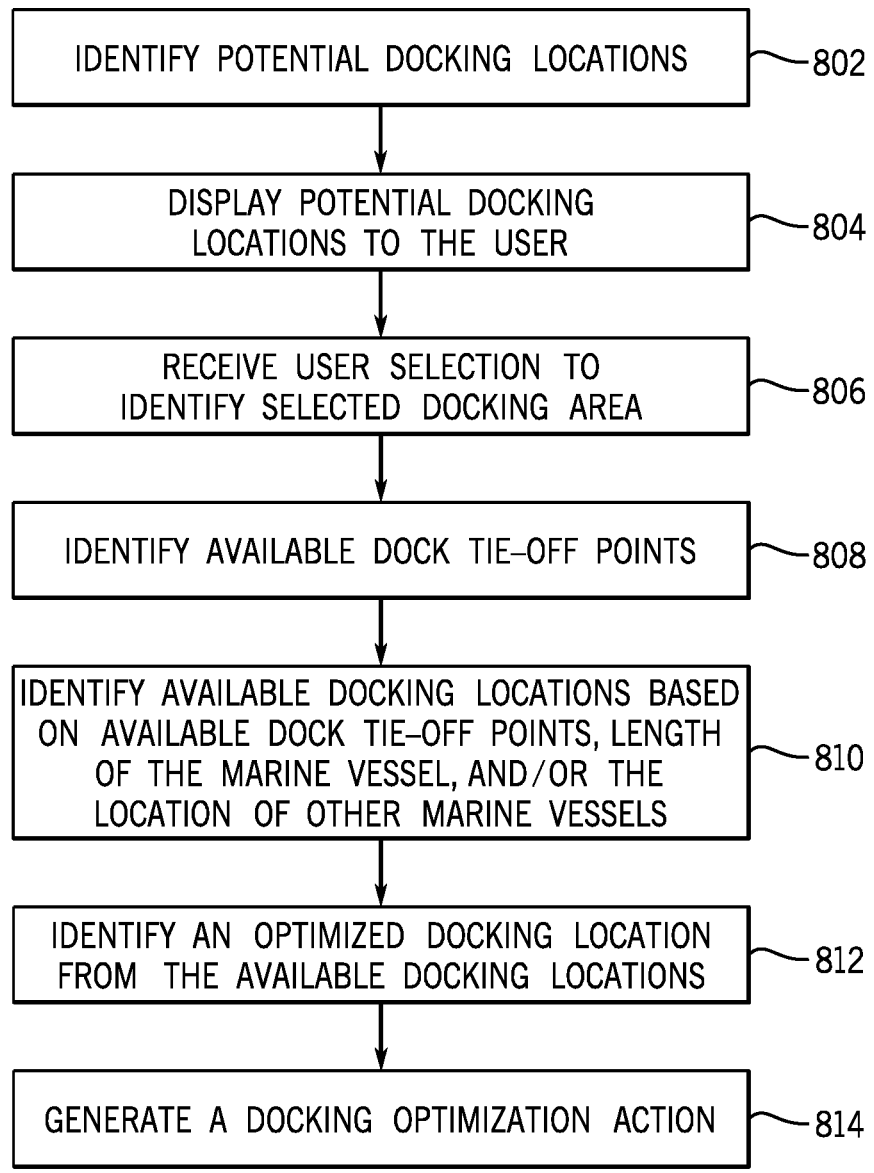
FIG. 8 illustrates an exemplary method for controlling docking in accordance with embodiments of the present disclosure.

FIG. 8 illustrates another exemplary method for controlling docking, according to one embodiment of the present disclosure. At 802, potential docking locations are identified. At 804, potential docking locations are displayed to the user. At 806, a user selection is received to identify the selected docking area. At 808, available dock tie-off points are identified. At 810, available docking locations are identified based on available dock tie-off points, the length of the marine vessel, and/or the locations of other marine vessels. At 812, an optimized docking location is identified from the available docking locations. Identifying an optimized docking location may be based on one or more of the following considerations: the best position for alignment with boat connection points, the shortest distance or travel time from the marine vessel's current location, the most available tie-off points, the type of tie-off points (e.g., based on a ranked list of preferences), at least a threshold distance from other boats, the furthest distance from any other docked marine vessel, user input of a tie-off purpose or the selection of a tie-off pattern, other user preferences for docking inputted by a user in a session or at system setup, and a user selection (available docking locations displayed to user for selection). At 814, a docking optimization action is generated. In one embodiment, the docking optimization action may include prompting a user to approve or deny the optimized docking location as a target docking location. In another embodiment, the docking optimization action may include setting a target docking location based on the optimized docking location and/or user input, and automatically controlling at least one marine drive to move the marine vessel from a current location to the target docking location.

Figure 9:
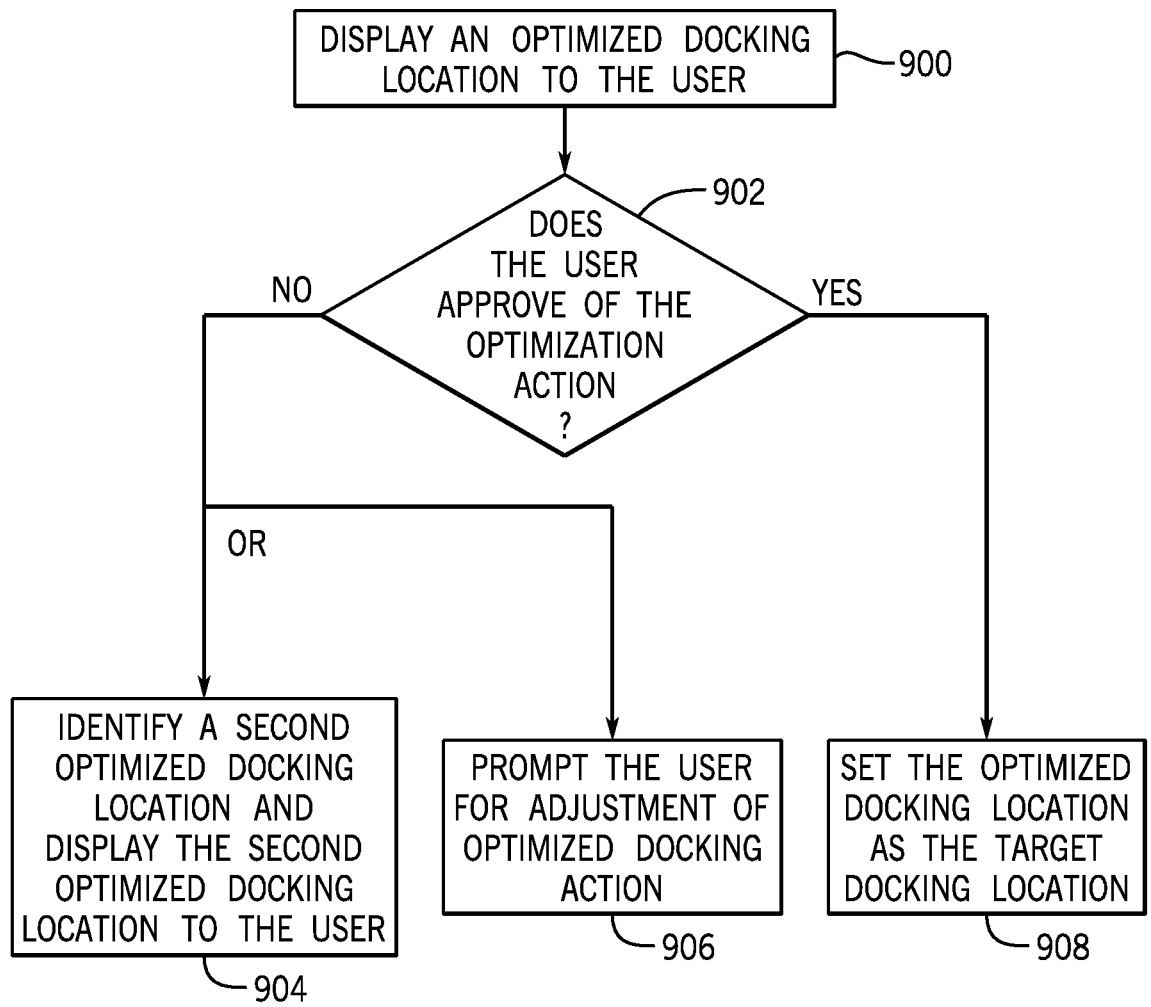
FIGS. 9-16 are flow charts exemplifying methods for controlling docking in accordance with embodiments of the present disclosure.

FIG. 9 exemplifies a method for controlling a docking in accordance with embodiments of the present disclosure. At 900, an optimized docking location is displayed to the user. At 902, the control system verifies whether the user approves of the optimization action. If not, at 904 the control system may identify a second optimized docking location and display the second optimized docking location to the user or, at 906, the control system may prompt the user for adjustment of the optimized docking action. Identification of a second optimized docking location may include a recalculation by the control system. In one embodiment, adjustment of the optimized docking location may include directional adjustment by a predetermined value. If the user does approve the optimization action then, at 908, the control system may set the optimized docking location as the target docking location.

Figure 10:
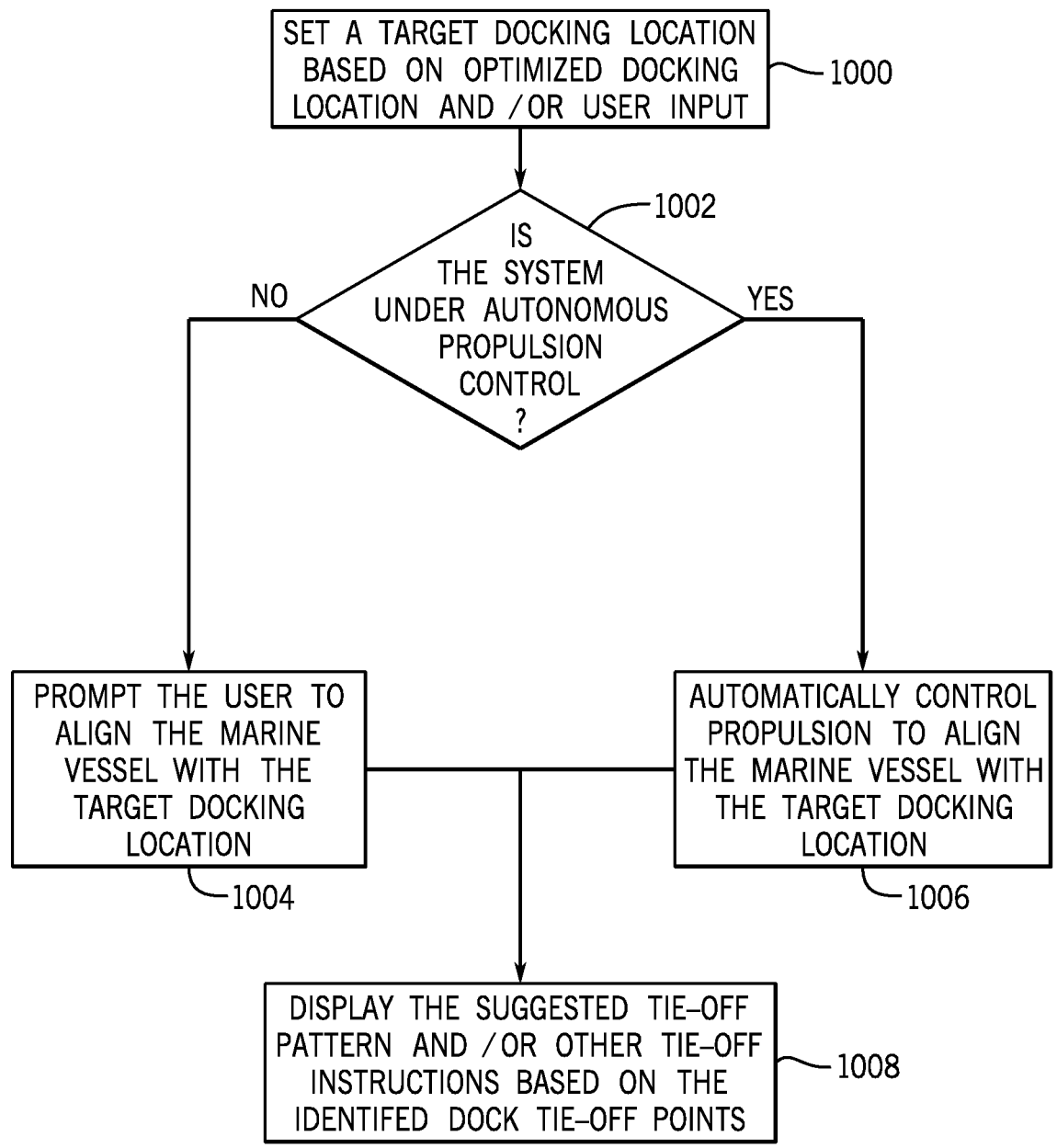

FIG. 10 is another flow chart exemplifying a method for controlling docking in accordance with embodiments of the present disclosure. At 1000, a target docking location is set based on an optimized docking location and/or user input. At 1002, the control system determines whether the docking control system is under autonomous propulsion control. If not, then at 1004, the user is prompted to align the marine vessel with the target docking location. If it is, then at 1006, propulsion is automatically controlled to align the marine vessel with the target docking location. The automatic control of propulsion may move the marine vessel towards the target docking location. At 1008, the suggested tie-off pattern and/or other tie-off instructions are displayed based on the identified dock tie-off points.

Figure 11:
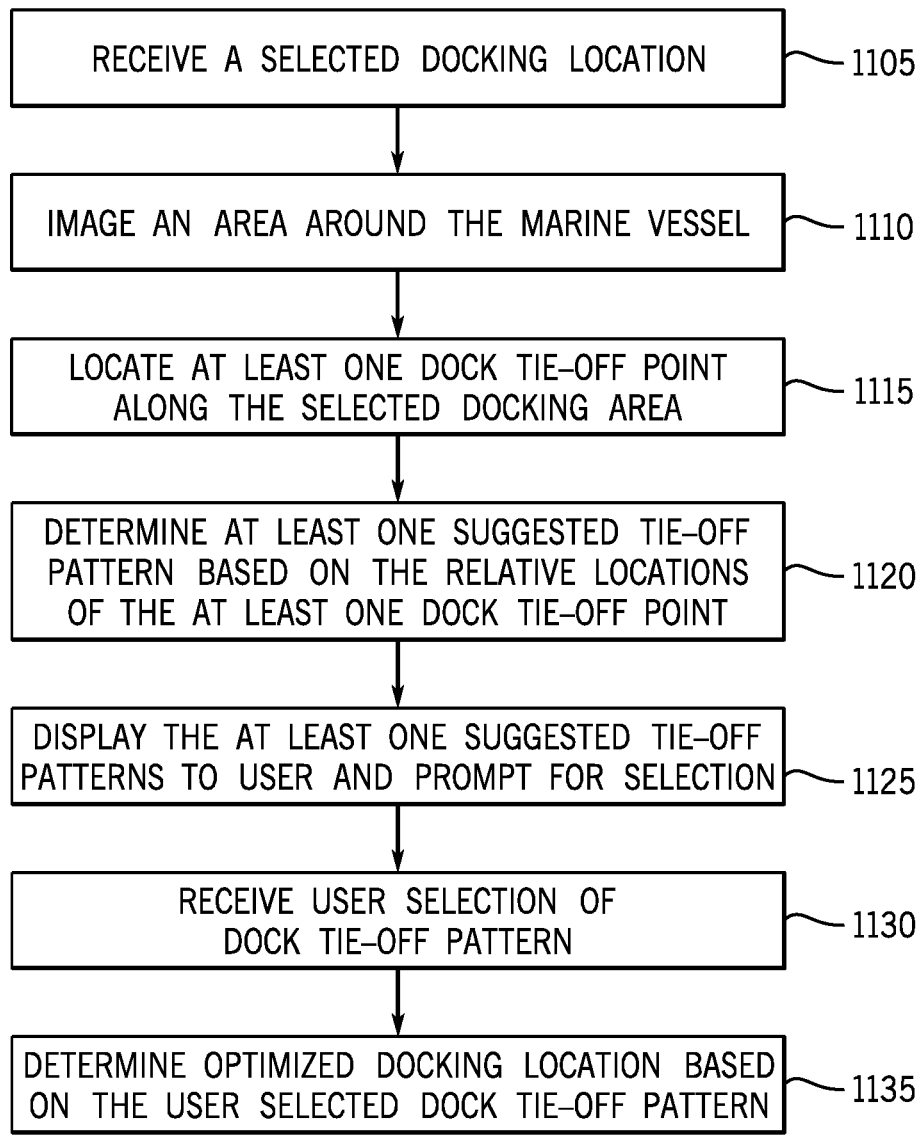

FIG. 11 illustrates another exemplary method for controlling docking according to one embodiment of the present disclosure. At 1105, a selected docking area is received. At 1110, an area around the marine vessel is imaged. At 1115, at least one dock tie-off point along the selected docking area is located. At 1120, at least one suggested tie-off pattern is determined based on the relative locations of the at least one dock tie-off point. At 1125, at least one suggested tie-off pattern is displayed to the user and prompts the user for a selection. At 1130, a user selection is received of the dock tie-off pattern. At 1135, an optimized docking location is determined based on the user selected dock tie-off pattern.

Figure 12:
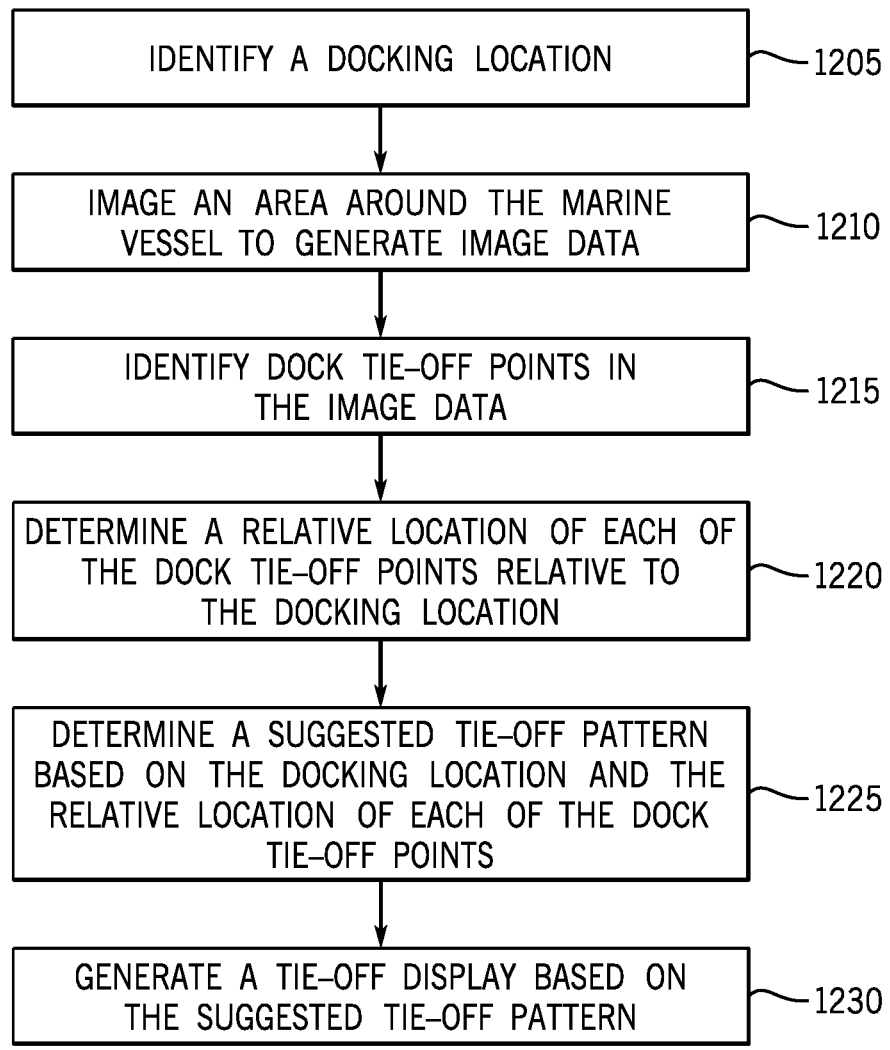

FIG. 12 illustrates another exemplary method for controlling docking according to one embodiment of the present disclosure. At 1205, a docking location is identified. A docking location may be one of the following: the current location of the marine vessel (e.g. when the marine vessel is docked at a location, the image system identifies the dock tie-off points around the vessel); the selected docking area (e.g., the control system generates options for display to a user as described above and in the following figure); or the target docking location (e.g., the control system generates a suggested tie off pattern based on where the marine vessel docks). At 1210, an area around the marine vessel is imaged to generate image data. At 1215, dock tie-off points are identified in the image data. At 1220, a relative location of each of the dock tie-off points is determined relative to the docking location. At 1225, a suggested tie-off pattern is determined based on the docking location and the relative location of each of the dock tie-off points. At 1230, a tie-off display is generated based on the suggested tie-off pattern.

Figure 13:
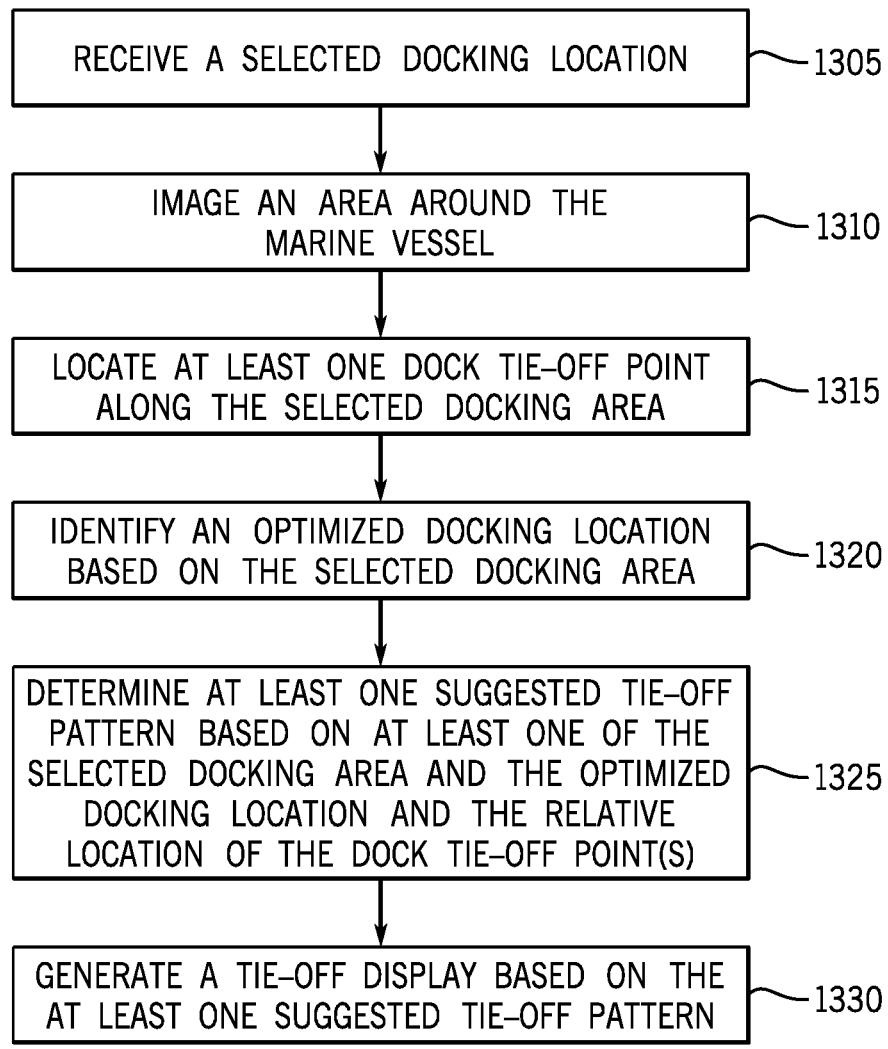

FIG. 13 illustrates another exemplary method for controlling docking according to one embodiment of the present disclosure. At 1305, a selected docking area is received. At 1310, an area around the marine vessel is imaged. At 1315, at least one dock tie-off point along the selected docking area is located. At 1320, an optimized docking location is based on the selected docking area is identified. At 1325, at least one suggested tie-off pattern is determined based on at least one of the selected docking areas and the optimized docking location and the relative location of the dock tie-off point(s). At 1330, a tie-off display is generated based on the at least one suggested tie-off pattern.

Figure 14:
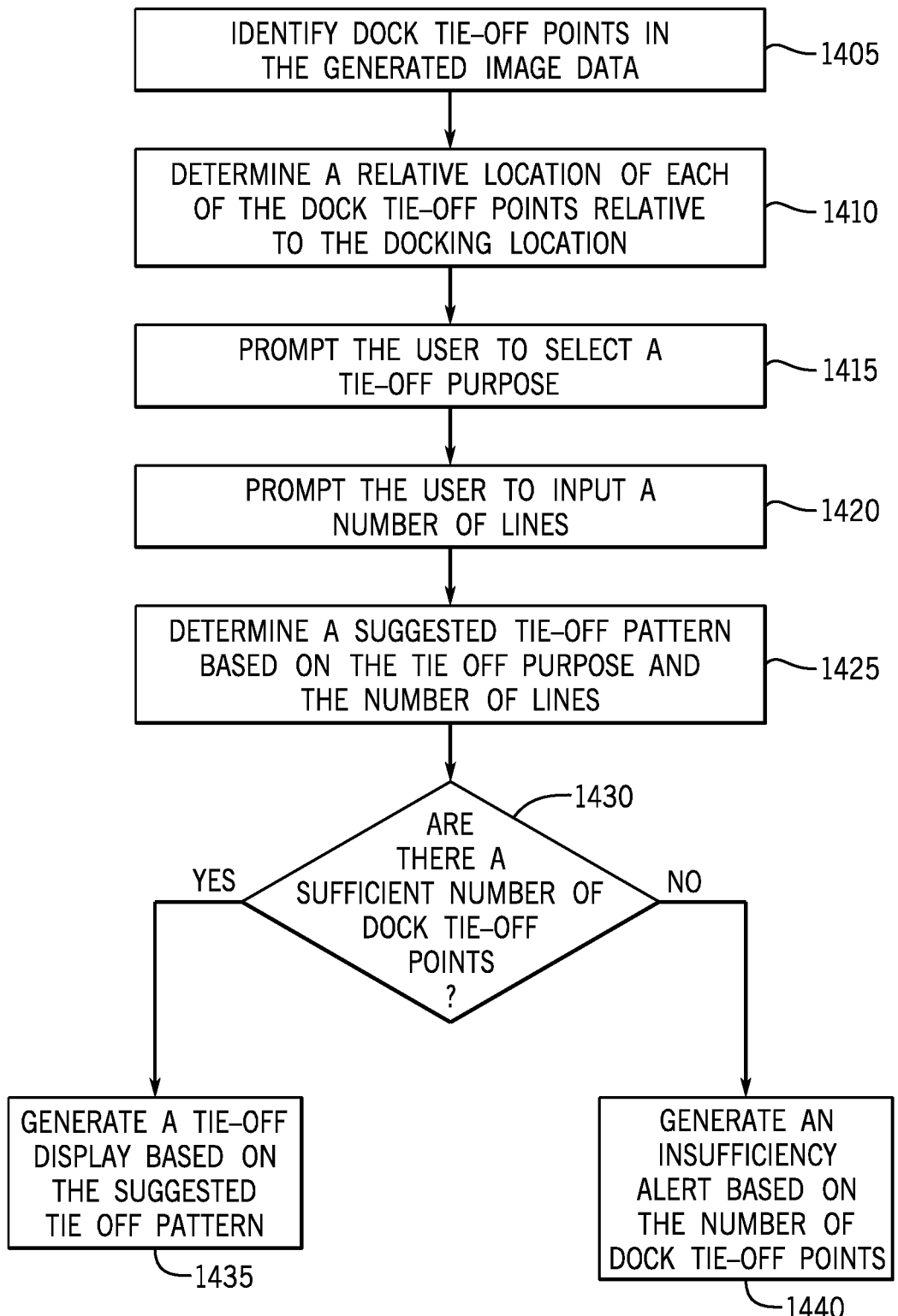

FIG. 14 illustrates another exemplary method for controlling docking according to one embodiment of the present disclosure. At 1405, dock tie-off points are identified in the generated image data. At 1410, a relative location of each of the dock tie-off points is determined relative to the docking location. At 1415, the user is prompted to select a tie-off purpose. At 1420, the user is prompted to input a number of lines. At 1425, a suggested tie-off pattern is determined based on the tie-off purpose and the number of lines. At 1430, whether there are a sufficient number of dock tie-off points is determined. If there are then, at 1435, a tie-off display is generated based on the suggested tie-off pattern. If not then, at 1440, an insufficiency alert is generated based on the number of dock tie-off points. An insufficiency alert may be generated based on a deficit number of required resources or dissimilarity between a selected tie-off purpose and the available tie-off patterns. In one embodiment, the control system may prompt the user to select another available docking location when available tie-off patterns are insufficient for the requirements of an optimized docking location.

Figure 15:
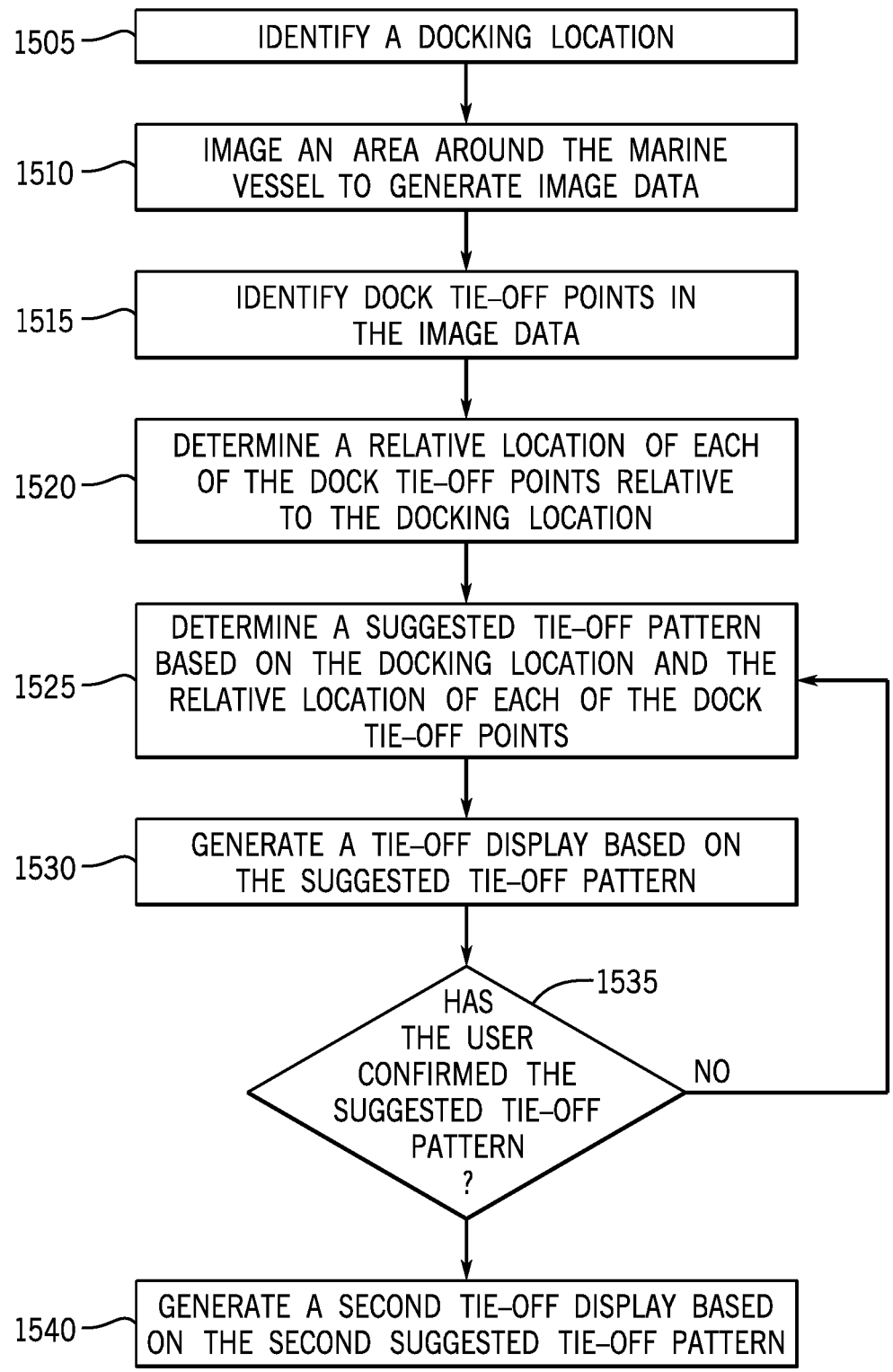

FIG. 15 illustrates another exemplary method for controlling docking according to one embodiment of the present disclosure. At 1505, a docking location is identified. At 1510, an area around the marine vessel is imaged to generate image data. At 1515, dock tie-off points in the image data are identified. At 1520, a relative location of each of the dock tie-off points is determined relative to the docking location. At 1525, a suggested tie-off pattern is determined based on the docking location and the relative location of each of the dock tie-off points. At 1530, a tie-off display is generated based on the suggested tie-off pattern. At 1535, the user input can confirm the suggested tie-off pattern. If user input rejecting the first tie-off pattern is received from the query, the control system may identify at least a second suggested tie-off pattern based on the docking location and the relative location of the dock tie-off points, wherein the second tie-off pattern is different than the first tie-off pattern. The generation of another suggested tie-off pattern may repeat iteratively as long as the system receives user input rejecting the suggested tie-off pattern. In one embodiment, there may be a predetermined number of possibilities for suggested tie-off patterns. After these possibilities have been exhausted the control system may generate an insufficiency alert as previously described. If the suggested tie-off pattern is confirmed then, at 1540, a second tie-off display is generated based on the second suggested tie-off pattern.

Figure 16:
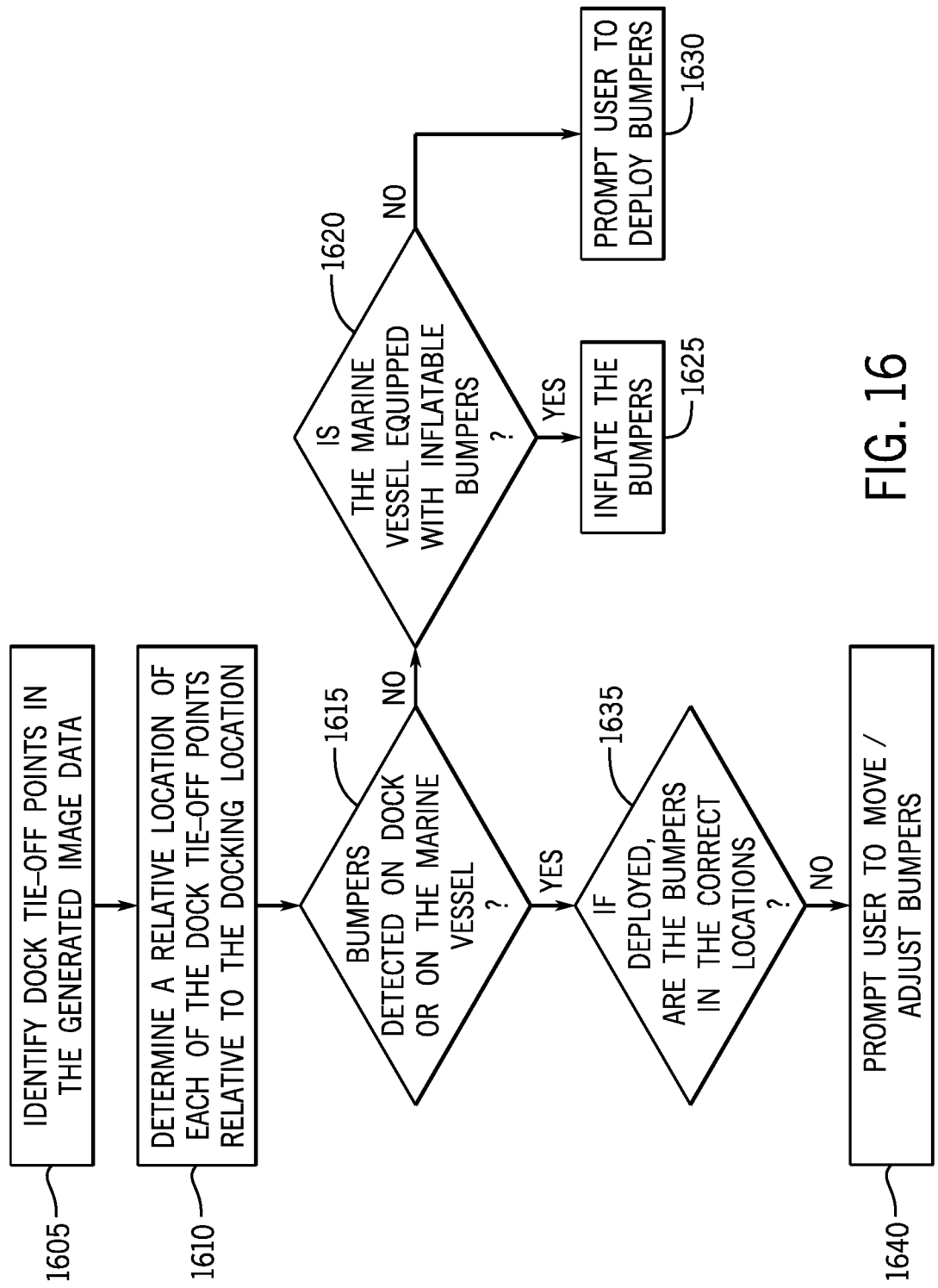

FIG. 16 illustrates another exemplary method for controlling docking according to one embodiment of the present disclosure. At 1605, dock tie-off points are identified in the generated image data. At 1610, a relative location of each of the dock tie-off points is determined relative to the docking location. At step 1615, the control system may use image data to determine whether bumpers are detected on the dock or the marine vessel. Visual confirmation may be necessary to determine if the user manually placed bumpers on the exterior of the marine vessel in preparation for docking. The same steps may be applied to fenders or other devices used in a similar manner. At step 1620, upon determination that there are no detected bumpers, the control system may check the existing inventory stored within the memory of the marine vessel to determine whether the marine vessel is equipped with inflatable bumpers. Upon determination of whether the marine vessel is equipped with inflatable bumpers, the control system will either auto-inflate the bumpers (if equipped) at 1625 or prompt the user to deploy bumpers when unequipped with inflatable bumpers (at 1630). At step 1635, the location of deployed bumpers may be measured and, if placement is improper, the control system may provide docking optimization instructions that describe bumper adjustments to position the bumpers in the correct locations (step 1640).

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method of controlling docking for a marine vessel, the method comprising:
    identifying a selected docking area;
    automatically controlling at least one marine drive to move the marine vessel relative to the selected docking area;
    with an imaging system on the marine vessel, imaging an area around the marine vessel to generate image data that includes at least one image of the selected docking area;
    locating at least one dock tie-off point along the selected docking area in the image data;
    identifying an optimized docking location based on the selected docking area and the location of the at least one dock tie-off point;
        determining at least one suggested tie-off pattern based on at least one of the selected docking area and the optimized docking location and the relative location of the dock tie-off points; and
    generating a tie-off display based on the at least one suggested tie-off pattern.

2. The method of claim 1, wherein locating the at least one dock tie-off point includes processing the image data to identify dock tie-off elements proximate to the selected docking area.

3. The method of claim 1, further comprising identifying at least one available docking location along the selected docking area based on the image data and a location of the at least one dock tie-off point and determining the optimized docking location by selecting from the at least one available docking location.

4. The method of claim 3, further comprising includes identifying available dock tie-off points, and wherein identifying the at least one available docking location is based on the identified available dock tie-off points.

5. The method of claim 1, further comprising identifying boat connection points on the marine vessel and identifying the optimized docking location based further on the boat connection points.

6. The method of claim 1, further comprising displaying a docking optimization instruction based on the optimized docking location.

7. The method of claim 1, further comprising prompting a user to approve or deny the optimized docking location as a target docking location.

8. The method of claim 1, further comprising, prior to receiving the selected docking area, automatically identifying a potential docking surface based on proximity measurements and/or the image data and displaying the potential docking surface for selection via a user interface.

9. The method of claim 1, further comprising setting a target docking location based on the optimized docking location and/or user input, and automatically controlling the at least one marine drive to move the marine vessel to the target docking location.

10. The method of claim 1, further comprising:
    setting a target docking location based on the optimized docking location and/or user input regarding the optimized docking location; and
    determining the at least one suggested tie-off pattern based on the target docking location and the location of the dock tie-off points.

11. A system for controlling docking of a marine vessel, the system comprising:
    an imaging system configured to image an area around a marine vessel to generate image data;
    a control system configured to:
        locate a selected docking area in the image data;
        control at least one marine drive to move the marine vessel relative to the selected docking area;

locate at least one dock tie-off point along the selected docking area in the image data;

identify an optimized docking location based on selected docking area and the location of the at least one dock tie-off point;

determine at least one suggested tie-off pattern based on at least one of the selected docking area and the optimized docking location and the relative location of the dock tie-off points; and generate a tie-off display based on the at least one suggested tie-off pattern.

12. The system of claim 11, wherein the control system is further configured to locate the at least one dock tie-off point by processing the image data to identify dock tie-off elements proximate to the selected docking area.

13. The system of claim 11, wherein the control system is further configured to: identify at least one available docking location along the selected docking area based on the image data and a location of the at least one dock tie-off point; and wherein determining the optimized docking location includes selecting from the at least one available docking location.

14. The system of claim 11, wherein the control system is further configured to identify boat connection points on the marine vessel and identifying the optimized docking location based further on the boat connection points.

15. The system of claim 11, further comprising controlling a display device to display a docking optimization instruction based on the optimized docking location.

16. The system of claim 11, further comprising controlling a display device to prompt a user to approve or deny the optimized docking location as a target docking location.

17. The system of claim 11, further comprising setting a target docking location based on the optimized docking location and/or user input, and wherein the control system is further configured to automatically control at least one marine drive to move the marine vessel from a current location to the target docking location.

18. The system of claim 11, wherein the control system is further configured to receive a selected tie-off purpose or a desired tie-off pattern via a user interface;

determine the optimized docking location and/or the at least one suggested tie-off pattern based further on the selected tie-off purpose or the desired tie-off pattern.

19. The system of claim 11, wherein the control system is further configured to:

set a target docking location based on the optimized docking location and/or user input regarding the optimized docking location; and determine the at least one suggested tie-off pattern based on the target docking location and the location of the dock tie-off points.

* * * * *